United States Patent
Yoo et al.

(10) Patent No.: US 10,333,602 B2
(45) Date of Patent: Jun. 25, 2019

(54) APPARATUS AND METHOD FOR SELECTING BEAM IN WIRELESS COMMUNICATION SYSTEM

(71) Applicant: Samsung Electronics Co., Ltd, Gyeonggi-do (KR)

(72) Inventors: Hyunil Yoo, Gyeonggi-do (KR); Taeyoung Kim, Seoul (KR); Jeehwan Noh, Gyeonggi-do (KR); Jiyun Seol, Gyeonggi-do (KR); Jae-Seung Son, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/520,059

(22) PCT Filed: Jun. 29, 2016

(86) PCT No.: PCT/KR2016/006945
§ 371 (c)(1),
(2) Date: Apr. 18, 2017

(87) PCT Pub. No.: WO2017/003172
PCT Pub. Date: Jan. 5, 2017

(65) Prior Publication Data
US 2018/0109303 A1    Apr. 19, 2018

(30) Foreign Application Priority Data

Jul. 1, 2015    (KR) .................. 10-2015-0094177

(51) Int. Cl.
*H04W 4/00*    (2018.01)
*H04B 7/06*    (2006.01)
(Continued)

(52) U.S. Cl.
CPC ......... *H04B 7/0617* (2013.01); *H04B 7/0619* (2013.01); *H04B 7/0695* (2013.01);
(Continued)

(58) Field of Classification Search
CPC .. H04B 7/0617; H04B 7/0619; H04B 7/0695; H04B 7/088; H04W 72/046; H04W 72/085
(Continued)

(56) References Cited

U.S. PATENT DOCUMENTS

2008/0134254 A1    6/2008  Xia et al.
2011/0110453 A1    5/2011  Prasad et al.
(Continued)

FOREIGN PATENT DOCUMENTS

EP    1562306 A1    8/2005
WO    2014074894 A1    5/2014

OTHER PUBLICATIONS

International Search Report dated Oct. 7, 2016 in connection with International Application No. PCT/KR2016/006945, 5 pages.
(Continued)

*Primary Examiner* — Sai Ming Chan

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). Embodiments of the present invention provide beamforming transmitting/receiving apparatus and method to use in Multiple Input Multiple Output (MIMO)-based wireless communication systems. According to an embodiment of the present invention, a method for operating a transmitting node in a wireless communication system is provided. The method includes determining at least one transmit beam candidate from a plurality of transmit beams and at least one receive
(Continued)

beam candidate from a plurality of receive beams, determining an optimal beam pair from pairs of the transmit beam candidates and the receive beam candidates, and transmitting/receiving data with a receiving node based on the optimal beam pair.

21 Claims, 27 Drawing Sheets

(51) Int. Cl.
| | |
|---|---|
| *H04W 72/04* | (2009.01) |
| *H04W 72/08* | (2009.01) |
| *H04B 7/08* | (2006.01) |
| H04B 7/0413 | (2017.01) |
| H04W 88/02 | (2009.01) |
| H04W 88/08 | (2009.01) |

(52) U.S. Cl.
CPC .......... *H04B 7/088* (2013.01); *H04W 72/046* (2013.01); *H04W 72/085* (2013.01); *H04B 7/0413* (2013.01); *H04W 88/02* (2013.01); *H04W 88/08* (2013.01)

(58) Field of Classification Search
USPC .......................................................... 370/329
See application file for complete search history.

(56) References Cited

U.S. PATENT DOCUMENTS

2013/0039345 A1* 2/2013 Kim .................... H04W 72/046
370/332
2014/0086077 A1   3/2014 Safavi

OTHER PUBLICATIONS

Written Opinion of the International Searching Authority dated Oct. 7, 2016 in connection with International Application No. PCT/KR2016/006945, 4 pages.

Alcatel, "Fast Beam Selection", 3GPP TSG RAN WG1 #33, R1-03-0739, New York, New York, Aug. 25-29, 2003, 6 pages.

IEEE Standards Association, "Part 11: Wireless LAN Medium Access Control (MAC) and Physical Layer (PHY) Specifications, Amendment 3: Enhancements for Very High Throughput in the 60 GHz Band", IEEE Std. 802.11ad, Dec. 28, 2012, 628 pages.

Y. Ming Tsang, et al., "Coding the Beams: Improving Beamforming Training in mmWave Communication System", Aug. 1, 2012, 6 pages.

Lei Huang, et al., "BF Training for MIMO Operation", NG60 SIG, Mar. 2015, 14 pages.

James Wang, "BF Training Considerations for MIMO Operation", NG60 SIG, Mar. 2015, 13 pages.

* cited by examiner

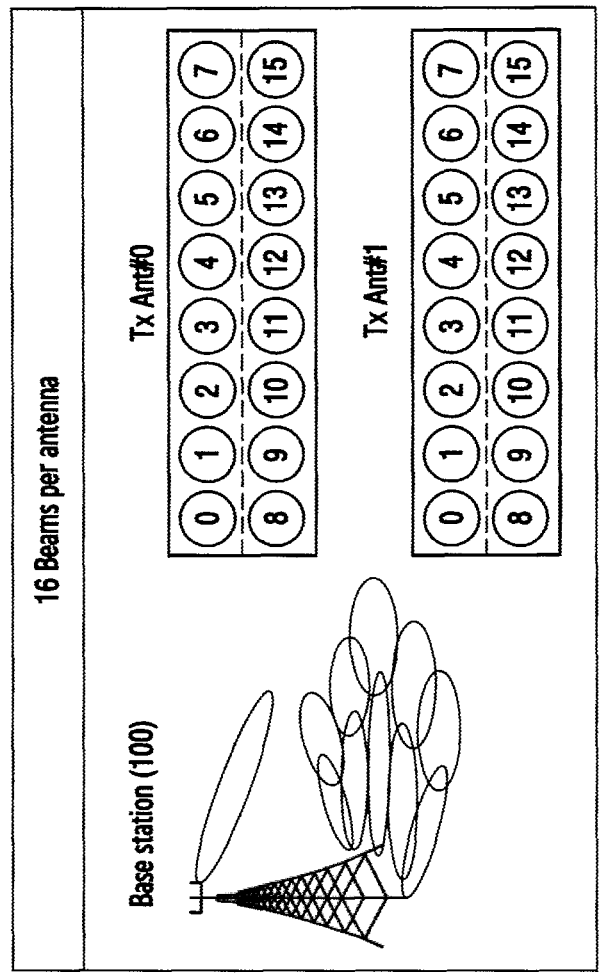
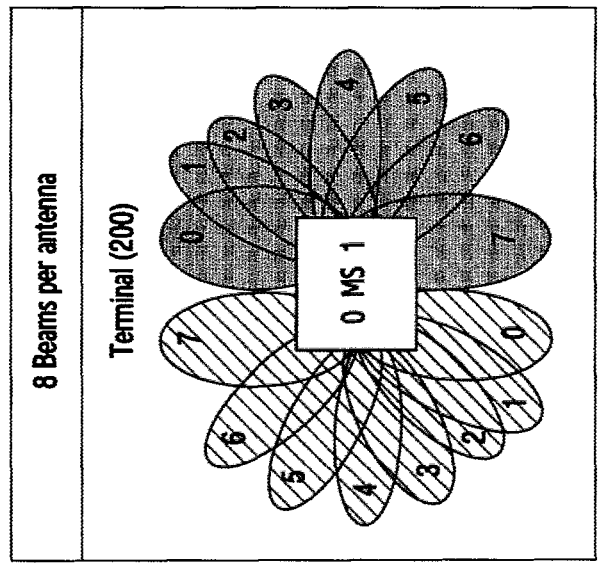
FIG.1B

1100

| Variable name | | | Number of bits | Description |
|---|---|---|---|---|
| AP-TXSS | \multicolumn{2}{l|}{Direction} | 1 bit | Forward link, reverse link indicator indicating |
| | \multicolumn{2}{l|}{CDOWN} | 9 bits | Show the number of remaining beams (sectors) |
| | RF chain 0 | Antenna ID | 2 bits | Currently transmitting antenna index |
| | | Sector ID | 9 bits | Currently transmitting beam(sector) index |
| | RF chain 1 | Antenna ID | 2 bits | Currently transmitting antenna index |
| | | Sector ID | 9 bits | Currently transmitting beam(sector) index |

FIG.11

| Variable name | | | Number of bits | Description |
|---|---|---|---|---|
| STA-TXSS | \multicolumn{2}{l|}{Direction} | 1 bit | Forward link, reverse link indicator indicating |
| | \multicolumn{2}{l|}{CDOWN} | 9 bits | Show the number of remaining beams (sectors) |
| | RF chain 0 | Antenna ID | 2 bits | currently transmitting antenna index |
| | | Sector ID | 6 bits | currently transmitting beam(sector) index |
| | RF chain 1 | Antenna ID | 2 bits | currently transmitting antenna index |
| | | Sector ID | 6 bits | currently transmitting beam(sector) index |

FIG.12

| Variable name | | | Number of bits | Description |
|---|---|---|---|---|
| AP-TXSS Feed-back | RF chain 0 | Antenna select | 2 bits | Selected antenna ID |
| | | Sector select_1 | 6 bits | First candidate beam information for antenna of AP |
| | | SNR report_1 | 8 bits | Sector select_1 SNR value |
| | | ⋮ | ⋮ | ⋮ |
| | | Sector select_nt | 6 bits | nt-th candidate beam information for antenna of AP |
| | | SNR report_nt | 8 bits | Sector select_nt SNR value |
| | RF chain 1 | Antenna select | 2 bits | Selected antenna ID |
| | | Sector select_1 | 6 bits | First candidate beam information for antenna of AP |
| | | SNR report_1 | 8 bits | Sector select_1 SNR value |
| | | ⋮ | ⋮ | ⋮ |
| | | Sector select_nt | 6 bits | nt-th candidate beam information for antenna of AP |
| | | SNR report_nt | 8 bits | Sector select_nt SNR value |

FIG.13

| | | Variable name | Number of bits | Description |
|---|---|---|---|---|
| STA-TXSS Feed-back | RF chain 0 | Antenna select | 2 bits | Selected antenna ID |
| | | Sector select_1 | 6 bits | First candidate beam information for antenna of STA |
| | | SNR report_1 | 8 bits | Sector select_1 SNR value |
| | | ⋮ | ⋮ | ⋮ |
| | | Sector select_mt | 6 bits | mt-th candidate beam information for antenna of STA |
| | | SNR report_mt | 8 bits | Sector select_mt SNR value |
| | RF chain 1 | Antenna select | 2 bits | Selected antenna ID |
| | | Sector select_1 | 6 bits | First candidate beam information for antenna of STA |
| | | SNR report_1 | 8 bits | Sector select_1 SNR value |
| | | ⋮ | ⋮ | ⋮ |
| | | Sector select_mt | 6 bits | mt-th candidate beam information for antenna of STA |
| | | SNR report_mt | 8 bits | Sector select_mt SNR value |

| Variable name | | Number of bits | Description |
|---|---|---|---|
| STA-RXSS | Direction | 1 bit | Forward link, reverse link indicator indicating |
| | CDOWN | 9 bits | Show the number of remaining beams (sectors) |

| Variable name | | Number of bits | Description |
|---|---|---|---|
| STA-RXSS (1910) | Direction | 1 bit | Forward link, reverse link indicator indicating |
| | CDOWN | 9 bits | Show the number of remaining beams (sectors) |
| STA-TXSS Feed-back (1920) | RF chain 0 — Antenna select | 2 bits | Selected antenna ID |
| | Sector select_1 | 6 bits | First candidate beam information for antenna of STA |
| | SNR report_1 | 8 bits | Sector select_1 SNR value |
| | ⋮ | ⋮ | ⋮ |
| | Sector select_mt | 6 bits | mt-th candidate beam information for antenna of STA |
| | SNR report_mt | 8 bits | Sector select_mt SNR value |
| | RF chain 1 — Antenna select | 2 bits | Selected antenna ID |
| | Sector select_1 | 6 bits | First candidate beam information for antenna of STA |
| | SNR report_1 | 8 bits | Sector select_1 SNR value |
| | ⋮ | ⋮ | ⋮ |
| | Sector select_mt | 6 bits | mt-th candidate beam information for antenna of STA |
| | SNR report_mt | 8 bits | Sector select_mt SNR value |

| Variable name | | | Number of bits | Description |
|---|---|---|---|---|
| AP-TXSS Feed-back | | Direction | 1 bit | Forward link, reverse link indicator indicating |
| | RF chain 0 | Antenna select | 2 bits | Selected antenna ID |
| | | Sector select_1 | 6 bits | Beam information of first signal strength for antenna of the selected AP |
| | | ⋮ | ⋮ | ⋮ |
| | | Sector select_nt | 6 bits | Beam information of nt/(n)-th signal strength for antenna of the selected AP |
| | RF chain 1 | Antenna select | 2 bits | Selected antenna ID |
| | | Sector select_1 | 6 bits | Beam information of first signal strength for antenna of the selected AP |
| | | ⋮ | ⋮ | ⋮ |
| | | Sector select_nt | 6 bits | Beam information of nt/(n)-th signal strength for antenna of the selected AP |

FIG.21

| Variable name | | Number of bits | Description |
|---|---|---|---|
| STA-TXSS Feed-back | Direction | 1 bit | Forward link, reverse link indicator indicating |
| | RF chain 0 — Antenna select | 2 bits | Selected antenna ID |
| | RF chain 0 — Sector select_1 | 6 bits | Beam information of first signal strength for antenna of the selected STA |
| | ⋮ | ⋮ | ⋮ |
| | RF chain 0 — Sector select_mt | 6 bits | Beam information of mt/(m)-th signal strength for antenna of the selected STA |
| | RF chain 1 — Antenna select | 2 bits | Selected antenna ID |
| | RF chain 1 — Sector select_1 | 6 bits | Beam information of first signal strength for antenna of the selected STA |
| | ⋮ | ⋮ | ⋮ |
| | RF chain 1 — Sector select_mt | 6 bits | Beam information of mt/(m)-th signal strength for antenna of the selected STA |

| Variable name | | Number of bits | Description |
|---|---|---|---|
| AP TXSS | Direction | 1 bit | Forward link, reverse link indicator indicating |
| | Sector ID | 6 bits | Currently transmitting beam(sector) index |
| | Antenna ID | 2 bits | Currently transmitting array antenna index |
| | CDOWN | 9 bits | Show the number of remaining beams (sectors) |

| Variable name | | Number of bits | Description |
|---|---|---|---|
| STA TXSS (2410) | Direction | 1 bit | Forward link, reverse link indicator indicating |
| | Sector ID | 6 bits | Currently transmitting beam(sector) index |
| | Antenna ID | 2 bits | Currently transmitting array antenna index |
| | CDOWN | 9 bits | Show the number of remaining beams (sectors) |
| AP TXSS Feedback (2420) | Ant select | 2 bits | Selected array antenna ID |
| | Sector select_1 | 6 bits | Beam information of first signal strength for antenna of the selected AP |
| | ⋮ | | ⋮ |
| | Sector select_n | 6 bits | Beam information of nt/(n)-th signal strength for antenna of the selected AP |

| Variable name | | Number of bits | Description |
|---|---|---|---|
| STA TXSS feedback | Direction | 1 bit | Forward link, reverse link indicator indicating |
| | Sector ID | 6 bits | currently transmitting beam(sector) index |
| | Antenna ID | 2 bits | currently transmitting array antenna index |
| | CDOWN | 9 bits | Show the number of remaining beams (sectors) |
| | Ant select | 2 bits | Selected array antenna ID |
| | Sector select_1 | 6 bits | Beam information of first signal strength for antenna of the selected STA |
| | ⋮ | | ⋮ |
| | Sector select_m | 6 bits | Beam information of m-th signal strength for antenna of the selected STA |

FIG.25

APPARATUS AND METHOD FOR SELECTING BEAM IN WIRELESS COMMUNICATION SYSTEM

CROSS-REFERENCE TO RELATED APPLICATION(S)

The present application claims priority under 35 U.S.C. § 365 to International Patent Application No. PCT/KR2016/006945 filed Jun. 29, 2016, entitled "APPARATUS AND METHOD FOR SELECTING BEAM IN WIRELESS COMMUNICATION SYSTEM", and, through International Patent Application No. PCT/KR2016/006945, to Korean Patent Application No. 10-2015-0094177 filed Jul. 1, 2015, each of which are incorporated herein by reference into the present disclosure as if fully set forth herein.

TECHNICAL FIELD

The present invention relates to a wireless communication system using beamforming technology.

BACKGROUND ART

To meet the demand for wireless data traffic having increased since deployment of 4$^{th}$ generation (4G) communication systems, efforts have been made to develop an improved 5$^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In recent, to satisfy a high traffic demand, a wireless communication system using a high frequency band (e.g., the extremely high frequency band) is attracting attention rapidly. For example, Institute of Electrical and Electronics Engineers (IEEE) 802.11ad standard defines a system which provides a service in the extremely high frequency band of 60 gigahertz (GHz) as a Wireless Local Area Network (WLAN)-based technology. Such a wireless communication system of the extremely high frequency band is considering use of a beamforming technique in order to mitigate a high propagation path loss in the extremely high frequency band. The IEEE 802.11ad standard is considering a beamforming system based on Single-Input Single-Output (SISO) and its adequate beamforming technique. Hence, a beamforming technique for a beamforming system based on Multiple-Input Multiple-Output (MIMO) is required.

DISCLOSURE OF INVENTION

Technical Problem

Hence, embodiments of the present invention provide an apparatus and a method for beamforming transmission and reception in a Multiple-Input Multiple-Output (MIMO)-based wireless communication system.

Embodiments of the present invention provide an apparatus and a method for selecting an adequate beam in a MIMO-based beamforming system.

Embodiments of the present invention provide an apparatus and a method for minimizing overhead of a beam training period for beam selection in a MIMO-based beamforming system.

Embodiments of the present invention provide an apparatus and a method for beam selection robust to blocking of a selected beam in a MIMO-based beamforming system.

Embodiments of the present invention provide an apparatus and a method for beam selection to lower reception complexity in a MIMO-based beamforming system.

Solution to Problem

According to an embodiment of the present invention, a method for operating a transmitting node of a wireless communication system is provided. The method includes determining at least one transmit beam candidate from a plurality of transmit beams and at least one receive beam candidate from a plurality of receive beams, determining an optimal beam pair from pairs of the transmit beam candidates and the receive beam candidates, and transmitting/receiving data with a receiving node based on the optimal beam pair.

Advantageous Effects of Invention

Embodiments of the present invention provide an apparatus and a method for selecting an adequate beam in a Multiple-Input Multiple-Output (MIMO)-based beamforming system. Such embodiments can minimize overhead of a beam training period for the beam selection, are robust to blocking of a selected beam, and lessen reception complexity.

BRIEF DESCRIPTION OF DRAWINGS

For a more complete understanding of the present invention and its effects, the following description will be made with reference to the accompanying drawings, where the same reference numerals represent the same parts.

FIG. 1A and FIG. 1B are diagrams showing a block diagram of a beamforming Multiple-Input Multiple-Output (MIMO) system to which embodiments of the present invention are applied.

FIG. 11 is a diagram showing Access Point (AP) transmit beam sweeping (AP-TXSS) information according to an embodiment of the present invention.

FIG. 12 is a diagram showing STAtion (STA) transmit beam sweeping (STA-TXSS) information according to an embodiment of the present invention.

FIG. 13 is a diagram showing AP-TXSS feedback information according to an embodiment of the present invention.

FIG. 14 is a diagram showing STA-TXSS feedback information according to an embodiment of the present invention.

FIG. 15 is a diagram showing STA receive beam sweeping (STA-RXSS) information according to an embodiment of the present invention.

FIG. 19 is a diagram showing STA-RXSS/STA-TXSS feedback information according to another embodiment of the present invention.

FIG. 21 is a diagram showing AP-TXSS feedback information according to another embodiment of the present invention.

FIG. 22 is a diagram showing STA-TXSS feedback information according to yet another embodiment of the present invention.

FIG. 23 is a diagram showing AP-TXSS information according to another embodiment of the present invention.

FIG. 24 is a diagram showing STA-TXSS/AP-TXSS feedback information according to yet another embodiment of the present invention.

FIG. 25 is a diagram showing STA-TXSS feedback information according to yet another embodiment of the present invention.

BEST MODE FOR CARRYING OUT THE INVENTION

Figure 1A:
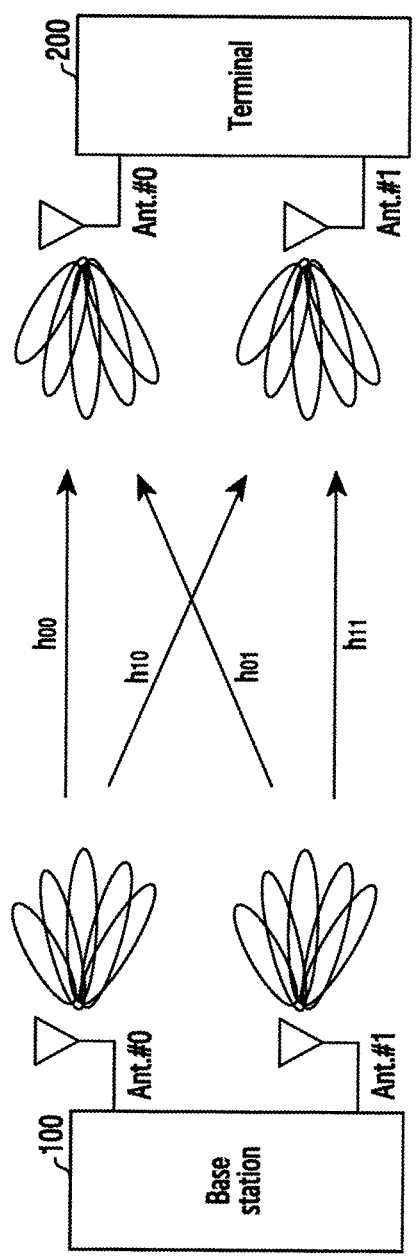

Hereinafter, embodiments of the present invention will be described in detail with reference to the accompanying drawings. In the following, only essential parts necessary to understand operations according to embodiments of the present invention will be explained, and other parts will not be explained when it is deemed that they may unnecessarily obscure the subject matter of the invention. Also, terminologies to be described below are defined in consideration of functions in the embodiments of the present invention and can vary depending on a user's or an operator's intention or practice. Thus, their definitions should be defined based on all the contents of the specification.

The present invention can make various changes and have various embodiments, and particular embodiments shall be explained in detail with the drawings. However, this is not to limit the present invention to particular embodiments, and it should be understood to include all changes, equivalents, and substitutes embraced in the spirit and technical field of the present invention. Thus, FIG. 1A through FIG. 26 are merely examples used to explain principles of the present invention in the present specification, and it is not construed to restrict the scope of the invention.

One of methods for satisfying high traffic demand in a wireless communication system is to use a wide frequency bandwidth. Since it is very difficult to secure a wide frequency bandwidth in a frequency (e.g., a frequency below 5 GHz) used by most wireless communication systems, it is required to secure a frequency band in a higher frequency. However, as a transmit frequency for radio communication increases, a propagation path loss increase. As a result, a propagation distance is relatively short to thus reduce service coverage. One of important techniques for addressing this, that is, for mitigating the propagation path loss and increasing the propagation distance is beamforming technique.

A transmitting node of a wireless communication system can conduct transmit beamforming. The transmit beamforming is a method which focuses a signal transmitted from each antenna in a particular direction using a plurality of antennas. A set of antennas is referred to as an array antenna, and the antenna included in the array antenna is referred to as an antenna element. The transmit beamforming can increase the propagation distance of the signal. Also, the transmit beamforming hardly transmits signals in other direction than a corresponding direction and accordingly can reduce interference affecting other user.

A receiving node of the wireless communication system can conduct receive beamforming using a receive array antenna. The receive beamforming focuses radio signals received and in a particular direction and thus increases reception signal sensitivity in a corresponding direction. Also, the receive beamforming blocks an interference signal by excluding a signal incoming from other direction than the corresponding direction from the receive signal.

As a transmit frequency is high, a wavelength of the propagation gets short. Hence, when the antenna is configured at intervals of a half wavelength, the array antenna can be constructed with more antenna elements within the same area. That is, a communication system operating in a high frequency band can obtain a relatively higher antenna gain than the beamforming technology used in a low frequency band and thus is advantageous to apply the beamforming technology. For example, Institute of Electrical and Electronics Engineers (IEEE) 802.11ad (WiGig) standard is considering a wireless communication system which provides a service and uses the beamforming technique in the extremely high frequency band, for example, 60 GHz.

Meanwhile, since the wireless communication system conforming to the IEEE 802.11ad standard considers only a Single-Input Single-Output (SISO)-based system, a beamforming technique suitable for a Multiple-Input Multiple-Output (MIMO)-based beamforming system which is expected to be used in future is demanded. Embodiments of the present invention to be explained relate to an apparatus and a method for beamforming transmission/reception suitable for a future pre-5G or post-11ad system, and more specifically, relate to MIMO beam selection method and apparatus. In the following, a MIMO beam selecting method in two phases will be described, and information required in each phase will be defined.

FIG. 1A is diagram showing a block diagram of a beamforming MIMO system to which embodiments of the present invention are applied. FIG. 1B is a diagram showing that a base station and a terminal of the beamforming MIMO system to which embodiments of the present invention is applied support a plurality of beam pairs per antenna.

Referring to FIG. 1A, a base station 100 includes two antennas Ant.#0 and Ant.#1. A terminal 200 includes two antennas Ant.#0 and Ant.#1. The antenna Ant.#0 of the terminal 200 receives a signal from the antenna Ant.#0 of the base station 100 over a channel h00. The antenna Ant.#0 of the terminal 200 receives a signal from the antenna Ant.#1 of the base station 100 over a channel h01. The antenna Ant.#1 of the terminal 200 receives a signal from the antenna Ant.#1 of the base station 100 over a channel h10. The antenna Ant.#1 of the terminal 200 receives a signal from the antenna Ant.#1 of the base station 100 over a channel h11. As such, the base station 100 and the terminal 200 configure a beamforming 2×2 MIMO system.

Referring to FIG. 1B, the number of beams per antenna of a transmitting side (e.g., the base station 100) and a receiving side (e.g., the terminal 200) can be plural. For example, the number of the beams per antenna of the base station 100 is 16, and the number of the beams per antenna of the terminal 200 is 8.

The base station 100 performs the transmit beamforming and the terminal 200 performs the receive beamforming in FIG. 1A and FIG. 1B, and vice versa. For example, the terminal 200 may conduct the transmit beamforming, and the base station 100 may conduct the receive beamforming. Also, the beamforming operation can be explained as the example performed between the base station 100 and the terminal 200, but it may be described as an example performed between an Access Point (AP) and a station (STA) to be explained. For example, the beamforming operation may be explained as an example performed between an initiator and a responder.

Figure 2:
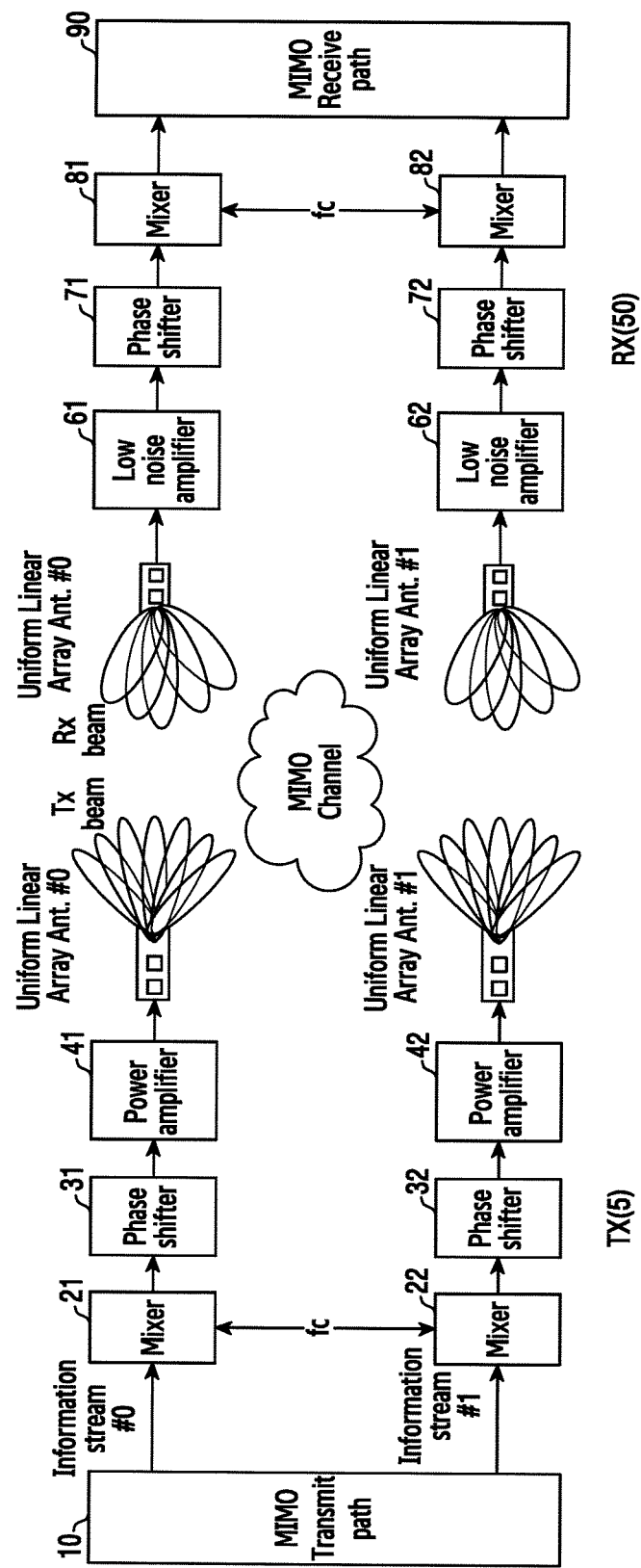
FIG. 2 is a diagram showing a basic structure of a beamforming MIMO system to which embodiments of the present invention are applied.

FIG. 2 is a diagram showing a basic structure of a beamforming MIMO system to which embodiments of the present invention are applied.

Referring to FIG. 2, the beamforming MIMO system includes a transmitting device 5. A MIMO transmit path 10 of the transmitting device 5 outputs information stream #0 and information stream #1. The information stream #0 is transmit-processed through a mixer 21, a phase shifter 31, and a power amplifier 41. The transmit-processed information stream #0 is output on a MIMO channel through a uniform linear transmit array antenna #0. The information stream #1 is transmit-processed through a mixer 22, a phase shifter 32, and a power amplifier 42. The transmit-processed information stream #1 is output on the MIMO channel through a transmit array antenna #1.

The beamforming MIMO system includes a receiving device 50. The receiving device 50 receive-processes the information streams output on the MIMO channel. The information stream #0 output on the MIMO channel is received via a receive array antenna #0 and then receive-processed through a low-noise amplifier 61, a phase shifter 71, and a mixer 81. The receive-processed information stream #0 is output to a MIMO receive path 90. The information stream #0 output on the MIMO channel is received via the receive array antenna #0 and then receive-processed through the low-noise amplifier 61, the phase shifter 71, and the mixer 81. The receive-processed information stream #0 is output to the MIMO receive path 90.

Figure 3:
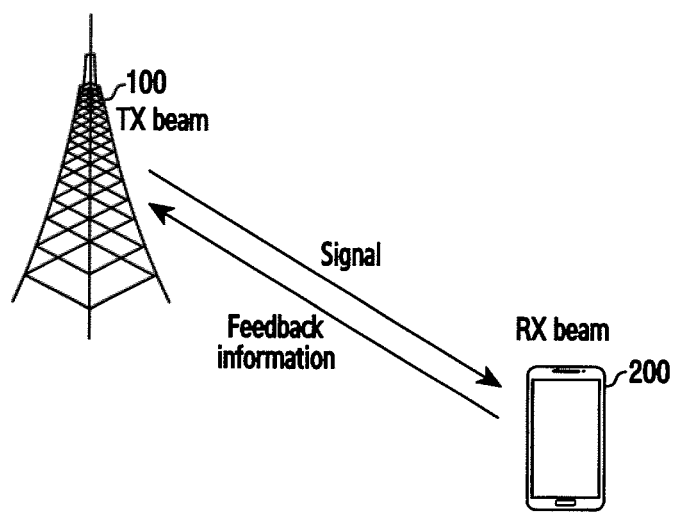
FIG. 3 is a diagram illustrating a concept of feedback information transmission and reception operations in a wireless communication system to which embodiments of the present invention are applied.

FIG. 3 is a diagram illustrating a concept of feedback information transmission and reception operations in a wireless communication system to which embodiments of the present invention are applied.

Referring to FIG. 3, a base station 100 and a terminal 200 can support beamforming. For example, the base station 100 can transmit a signal using a transmit beam, and the terminal 200 can receive the signal using a receive beam. Herein, the base station 100 and the terminal 200 each can include a plurality of antennas. The base station 100 can support a plurality of transmit beams per antenna. Similarly, the terminal 200 can support a plurality of receive beams per antenna. The terminal 200 selects receive the signal from the base station 100, selects a plurality of base station transmit beam candidates, and feeds information about the selected base station transmit beam candidate back to the base station 100. Also, the base station 100 receives a signal from the terminal 200, selects a plurality of terminal transmit beam candidates, and feeds information about the selected terminal transmit beam candidate back to the terminal 200.

Contrary to the beam selecting operation according to embodiments of the present invention, a beam selecting operation of the IEEE 802.11ad standard includes a Sector Level Sweep (SLS) process which selects a rough beam and a Beam Refinement Protocol (BRP) process which selects a fine beam.

The SLS process determines an approximate transmit direction using a relatively wide beam. In this step, relatively less antenna elements are used. Herein, the transmitting node operates in a beamforming mode (directional antenna mode), and the receiving node operates in a quasi-omni antenna mode. The receiving node can estimate the transmit beam of the transmitting node by receiving a particular signal (e.g., a preamble) transmitted by the transmitting node while sweeping the beam.

The BRP process finely determines a transmit/receive beam pair using a relatively narrow beam. The BRP process uses relatively more antenna elements than the SLS process, and can increase precision through iterations. The BRP process establishes a minimum communication state such as control packet and beacon transmission, and determines an optimal beam between the transmitting node and the receiving node.

As such, the beam selecting operation according to the IEEE 802.11ad standard basically conducts the process for determining the transmit beam, and, if necessary, can perform a process for determining the receive beam. In so doing, the beam selecting operation is executed in the quasi-omni mode.

The MIMO beam selecting operation according to embodiments of the present invention is performed in two phases including a first phase and a second phase.

The first phase selects a plurality of candidate beams using an omni-based beam sweep scheme. The first phase uses a relatively narrow beam used for beam alignment in the BRP process of IEEE 802.11ad, which is different from the relatively wide sector beam used in the SLS process of IEEE 802.11ad, to select a plurality of candidate beams. Also, the first phase combines and operates TXSS and RXSS, not individually.

The second phase selects an optimal beam from the candidate beams. The BRP process of IEEE 802.11ad selects the beam based on the quasi-omni mode in the transmitting node or the receiving node. In contrast, the second phase performs beam training which selects the beam while conducting the beamforming in both of the transmitting node and the receiving node.

The beam selection of IEEE 802.11ad based on the SISO is fulfilled based on the quasi-omni and Receive Signal Strength Indicator (RSSI). Since channel capacity of the SISO can be expressed as $C=\log_2(1+SNR)$, the channel capacity can be estimated by approximating the RSSI to a Signal to Noise Ratio (SNR). While the method for selecting the beam while conducting both of the transmit and receiving beamforming in the SISO-based communication system is subject to great complexity, selecting the beam of great RSSI while selecting the beam based on the quasi-omni mode in the transmitting node or the receiving node makes no great different in terms of performance.

However, the channel capacity of the MIMO-based communication system considers a channel rank not considered in calculating the channel capacity of the SISO-based communication system, as shown in $$C = \log_2 \det\left(I + \frac{E_x}{N_T N_0} HH^H\right).$$

Herein, $E_x$ denotes an energy of the transmit signal, $N_T$ denotes the number of transmit antennas, $N_0$ denotes a noise, and H denotes a channel gain. Hence, the beam selecting method according to embodiments of the present invention estimates the beam while conducting the beamforming in both of the transmitting node and the receiving node in a BRP period.

The operation of the first phase according to embodiments of the present invention can minimize beam training overhead compared with IEEE 802.11ad. Also, the operation of the first phase can increase robustness to a blocker by selecting and tracking the plurality of the candidate beams. The operation of the second phase can reduce a search space and thus decrease reception complexity.

Figure 4:
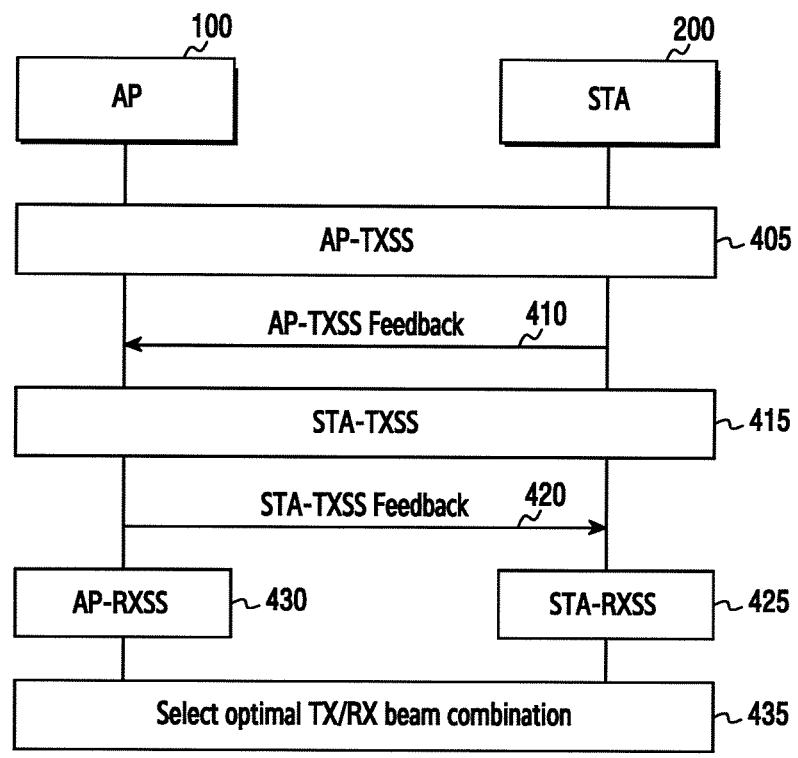
FIG. 4 is a diagram illustrating a processing procedure of a beam selecting operation according to embodiments of the present invention.

FIG. 4 is a diagram showing a processing procedure of a beam selecting operation according to embodiments of the present invention. This processing procedure corresponds to the operation for selecting the optimal beam when the base station and the terminal of FIG. 1A are an AP 100 and a STA 200 respectively.

Referring to FIG. 4, in step 405, the AP 100 performs AP transmit sector sweep (AP-TXSS) and the STA 200 selects a plurality of AP candidate TX beams from AP TX beams. The AP 100 sweeps relatively narrow beams and sends a particular signal (e.g., a preamble). The STA 200 receives a signal from the AP 100 in the quasi-omni mode and selects narrow TX beams of the AP as candidate beams.

In step 410, the STA 200 feeds information about the selected AP candidate TX beams back to the AP 100.

In step 415, the STA 200 performs STA transmit sector sweep (STA-TXSS) and the AP 100 selects a plurality of STA candidate TX beams from STA TX beams. The STA 200 sweeps relatively narrow beams and sends a particular signal (e.g., a preamble). The AP 100 receives a signal from the STA 200 in the quasi-omni mode and selects narrow TX beams of the AP as candidate beams.

In one embodiment, step 410 and step 415 are the operations conducted by the STA 200 and can be executed in the same period.

In step 420, the AP 100 feeds information about the selected STA candidate TX beams back to the STA 200.

In step 425, the STA 200 performs STA receiver sector sweep (STA-RXSS) and selects a plurality of STA candidate RX beams from STA RX beams. For the STA-RXSS, the AP 100 sends a signal in the quasi-omni mode or through the beamforming, and the STA 200 receives the signal from the AP 100 by changing the beam and selects narrow RX beams of the STA as candidate beams. In an embodiment, when the AP 100 sends the signal using the beamforming, the beam of the maximum signal strength can be used.

In step 430, the AP 100 performs AP receiver sector sweep (AP-RXSS) and selects a plurality of AP candidate RX beams from AP RX beams. For the AP-RXSS, the STA 200 sends a signal in the quasi-omni mode or through the beamforming, and the AP 100 receives the signal from the STA 200 by changing the beam and selects narrow RX beams of the AP as candidate beams. In an embodiment, when the STA 200 sends the signal using the beamforming, the beam of the maximum signal strength can be used.

Figure 10:
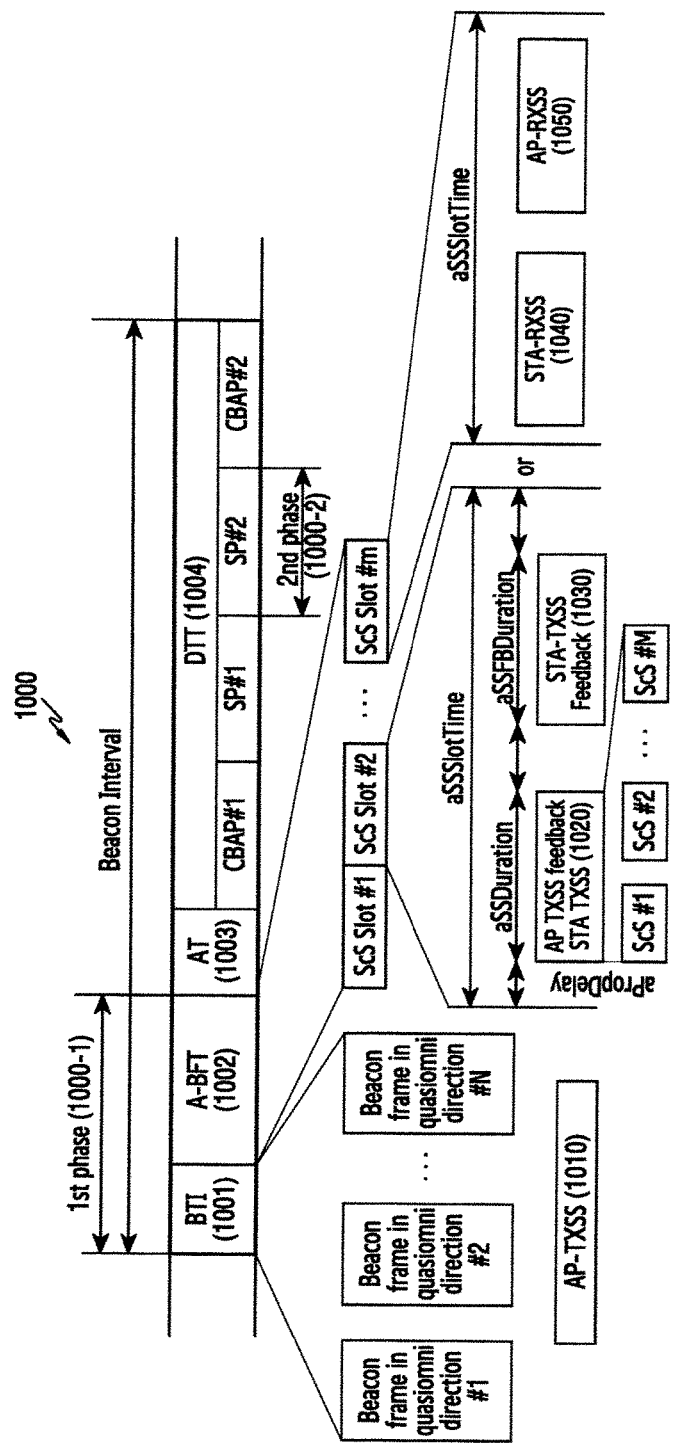
FIG. 10 is a diagram illustrating a processing procedure of a MIMO beam selecting operation according to an embodiment of the present invention.

In an embodiment, for the STA-RXSS 425, AP-TXSS is first conducted separately from the AP-TXSS of step 405 and then the STA-RXSS 425 and the AP-RXSS 430 can be executed (see Scheme 1 of FIG. 10).

Figure 18:
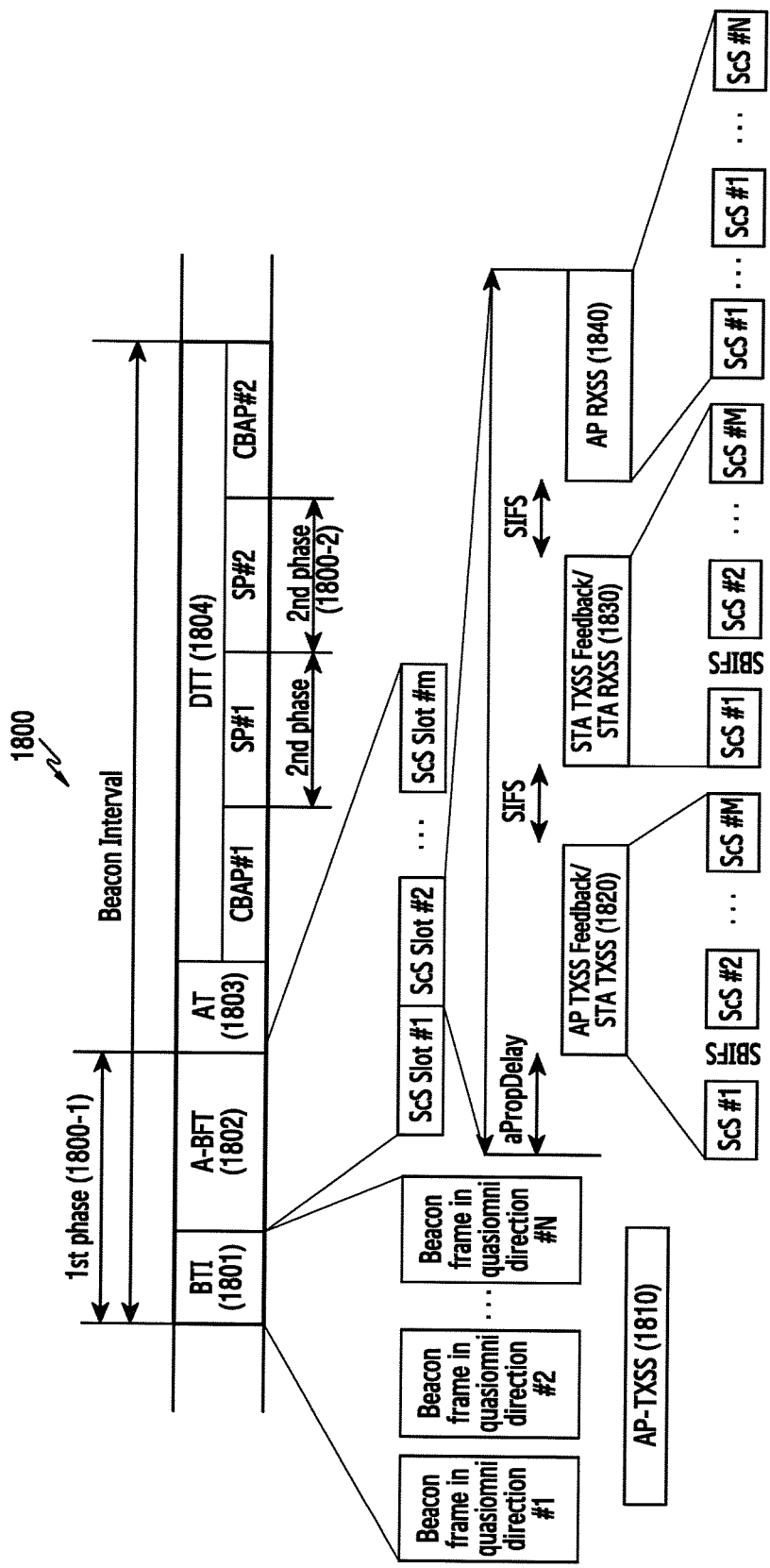
FIG. 18 is a diagram illustrating a processing procedure of a MIMO beam selecting operation according to another embodiment of the present invention.

In another embodiment, the STA-TXSS feedback process is combined with the STA-RXSS 425 and then the AP-RXSS 430 can be conducted (see Scheme 2 of FIG. 18). In this case, the AT-TXSS for the STA-RXSS 425 may not be performed.

Figure 20:
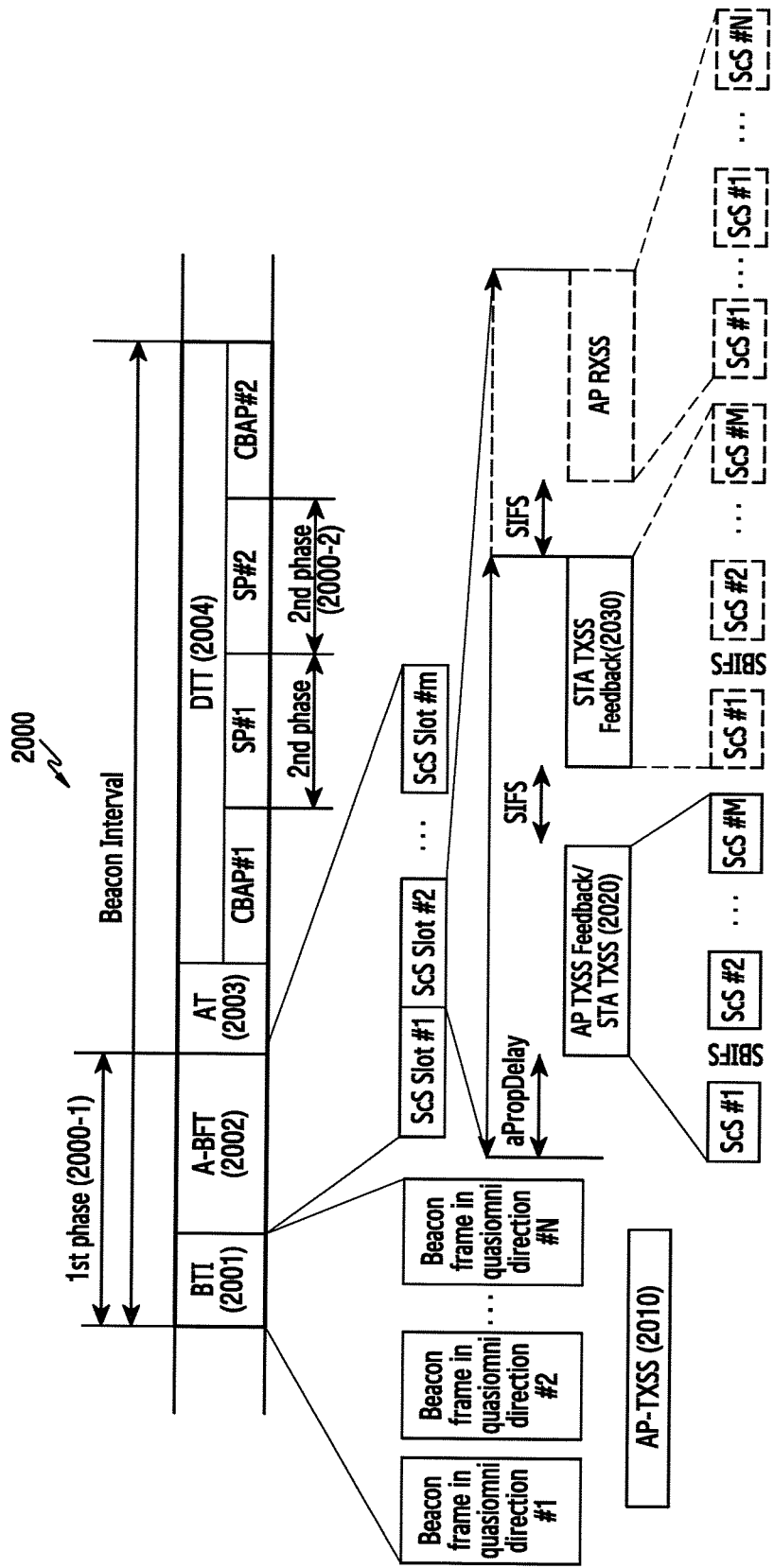
FIG. 20 is a diagram illustrating a processing procedure of a MIMO beam selecting operation according to yet another embodiment of the present invention.

In another embodiment, when beam reciprocity exists between a downlink beam and an uplink beam, the STA-RXSS 425 and the AP-RXSS 430 may not be performed (see Scheme 3 of FIG. 20).

In step 435, the AP 100 and the STA 200 each select an optimal TX/RX beam pair. After selecting a plurality of TX/RX beams, the AP 100 and the STA 200 each perform one-shot beam training using the beam pairs and select the optimal TX/RX beam pair for the MIMO communication.

In an embodiment, the AP 100 can select an optimal uplink beam pair to be used to receive data transmitted from the STA 200 to the AP 100 among beam pairs of the TX beam candidates of the STA 200 and the RX beam candidates of the AP 100. For example, the AP 100 can select the optimal uplink beam pair from the beam pairs based on one of the signal strength and the channel capacity of the beam pairs of the candidates. The AP 100 can feed information about the optimal uplink beam pair back to the STA 200. The STA 200 receives from the AP 100 the information about the optimal uplink beam pair to be used to transmit data from the STA 200 to the AP 100 among the beam pairs of the TX beam candidates of the STA 200 and the RX beam candidates of the AP 100. Next, based on the optimal beam information, the STA 200 can transmit uplink data and the AP 100 can receive the uplink data.

In another embodiment, the STA 200 can select an optimal downlink beam pair to be used to transmit data from the AP 100 to the STA 100 among beam pairs of the TX beam candidates of the AP 100 and the RX beam candidates of the STA 200. For example, the STA 200 can select the optimal downlink beam pair based on one of the signal strength and the channel capacity of the beam pairs. The STA 200 can feed information about the optimal downlink beam pair back to the AP 100. The AP 100 receives from the STA 200 the information about the optimal downlink beam pair to be used to transmit data from the AP 100 to the STA 200 among the beam pairs of the TX beam candidates of the AP 100 and the RX beam candidates of the STA 200. Next, based on the optimal beam information, the AP 100 can transmit downlink data and the STA 200 can receive the downlink data.

Step 405 through step 430 correspond to the first phase of the beam selecting operation according to embodiments of the present invention, and step 435 corresponds to the second phase.

Figure 5:
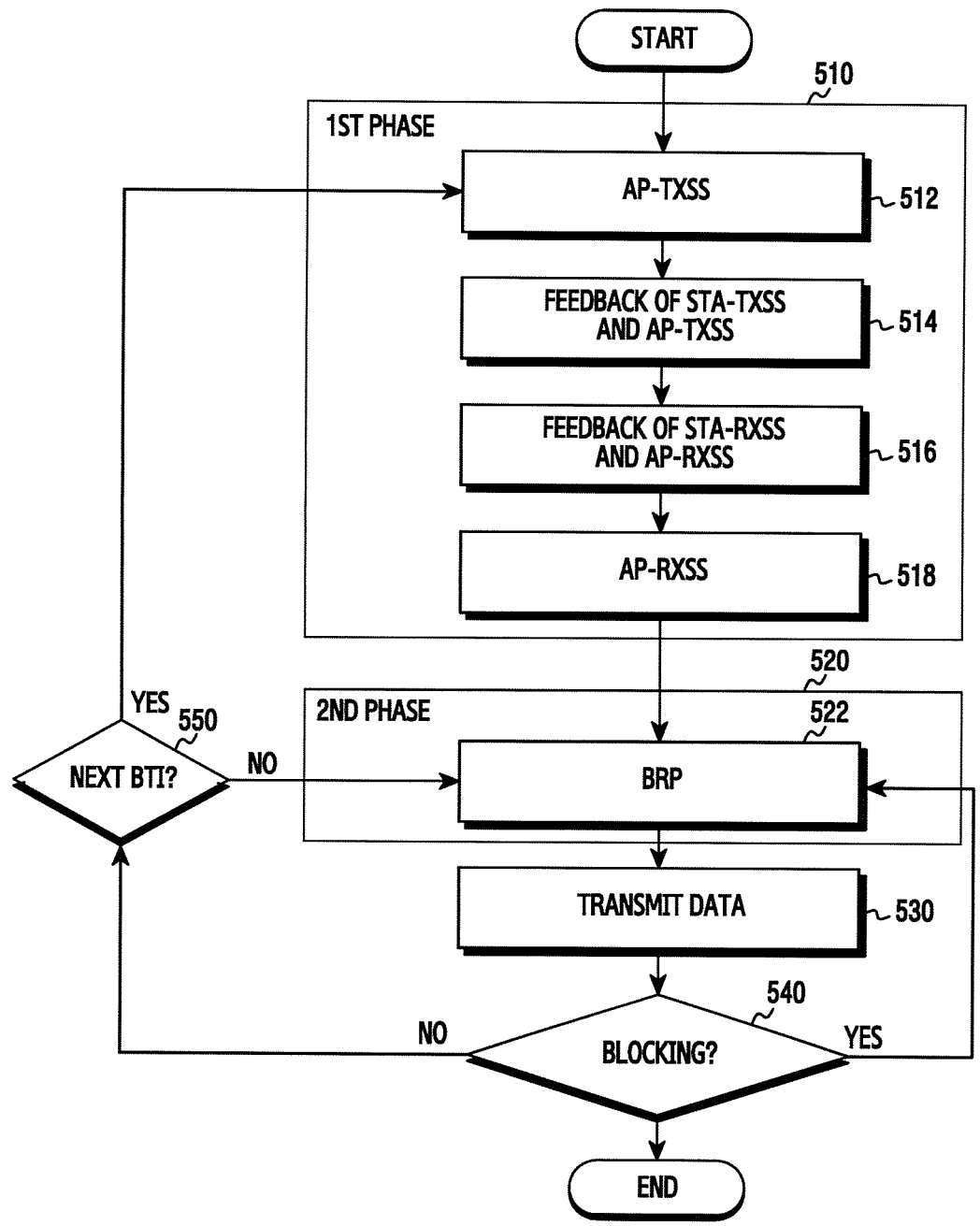
FIG. 5 is a diagram illustrating a processing procedure of a beam selecting operation and a data transmitting operation according to embodiments of the present invention.

FIG. 5 is a diagram showing a processing procedure of a beam selecting operation and a data transmission operation according to embodiments of the present invention. This processing flow corresponds to a flow of operations for selecting an optimal beam when the base station and the terminal of FIG. 1A are the AP 100 and the STA 200 respectively.

Referring to FIG. 5, a first phase 510 selects a plurality of TX/RX beam candidates. In step 512, the AP 100 performs an AP-TXSS operation, and the STA 200 selects a plurality of AP TX beam candidates from a plurality of AP TX beams according to the AP-TXSS. In step 514, the STA 200 performs an STA-TXSS operation, and the AP 100 selects a plurality of STA TX beam candidates from a plurality of STA TX beams according to the STA-TXSS. Also, in step 514, the STA 200 feeds information about the AP TX beam candidates back to the AP 100. In step 516, the STA 200 performs an STA-RXSS operation. Also, in step 516, the AP 100 feeds information about the STA TX beam candidates back to the STA 200. In step 518, the AP 100 performs an AP-RXSS operation.

In a second phase 520, the AP 100 and the STA 200 select optimal TX/RX beams. That is, the second phase performs a BRP step 522 by combining the TX/RX beam candidates and thus selects a MIMO beam.

In step 530, the AP 100 and the STA 200 transmit/receive data using the selected beam pair. When determining blocking of the selected beam or blocking of data transmission during the data transmission in step 540, the AP 100 and the STA 200 can re-conduct the BRP process and thus update the beam pair.

The above-stated operation is executed based on a Beam transmission Interval (BTI) period unit. When determining that one BTI period passes in step 550, the operation returns to step 512 and performs the operations of the first phase 510 again.

Figure 6:
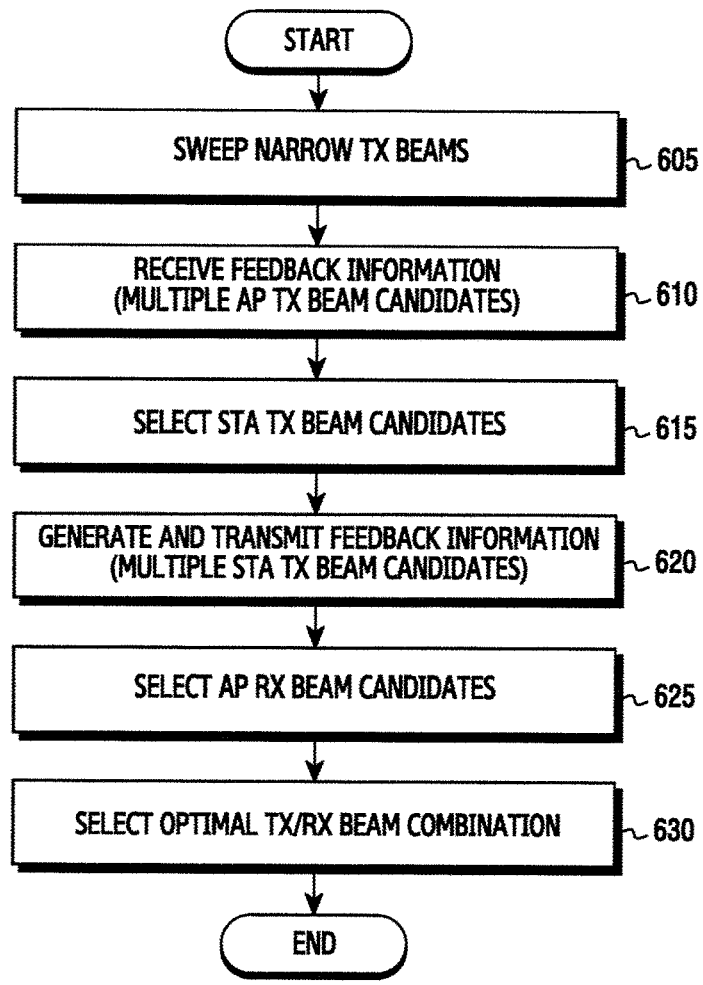
FIG. 6 is a diagram illustrating a processing procedure of a beam selecting operation by a transmitting device of a MIMO system according to embodiments of the present invention.

FIG. 6 is a diagram showing a processing flow of a beam selecting operation by a transmitting device of a MIMO system according to embodiments of the present invention. This processing flow corresponds to operations for selecting an optimal beam when the transmitting device is the base station of FIG. 1A or the AP 100.

Referring to FIG. 6, in step 605, the AP 100 performs AP-TXSS. That is, AP 100 transmits a signal (e.g., a preamble) while sweeping specific relatively narrow beams. The STA 200 receives a signal from the AP 100 in the quasi-omni mode and selects narrow TX beams of the AP as the candidate beams.

In step 610, the AP 100 receives feedback information about the AP candidate TX beams selected by the STA 200, from the STA 200.

In step 615, when the STA 200 conducts STA-TXSS, the AP 100 selects a plurality of STA candidate TX beams from a plurality of STA TX beams. That is, when the STA 200 transmits a particular signal (e.g., a preamble) while sweeping specific relatively narrow beams, the AP 100 receives a signal from the STA 200 in the quasi-omni mode and selects the narrow TX beams of the STA as the candidate beams.

In step 620, the AP 100 generates feedback information with information about the selected STA candidate TX beams and feeds the information back to the STA 200.

In step 625, the AP 100 conducts AP-RXSS and selects a plurality of AP candidate RX beams from a plurality of AP RX beams. For the AP-RXSS, when the STA 200 sends a signal in the quasi-omni mode or using the beamforming, the AP 100 receives the signal from the STA 200 by changing the beam and thus selects narrow RX beams of the AP as candidate beams. When beam reciprocity exists between a downlink beam and an uplink beam, the AP-RXSS 625 may not be performed.

In step 630, the AP 100 selects an optimal TX/RX beam pair. The AP 100 performs one-shot beam training using the TX/RX beam pairs and selects the optimal TX/RX beam pair for MIMO communication.

In an embodiment, the AP 100 can select an optimal uplink beam pair to be used to receive data transmitted from the STA 200 to the AP 100 from the beam pairs of the TX beam candidates of the STA 200 and the RX beam candidates of the AP 100. For example, the AP 100 can select the optimal uplink beam pair from the beam pairs based on one of the signal strength and the channel capacity of the beam pairs of the candidates.

Next, the STA 200 receives from the AP 100 the information about the optimal uplink beam pair to be used to transmit data from the STA 200 to the AP 100 among the beam pairs of the TX beam candidates of the STA 200 and the RX beam candidates of the AP 100. Thus, based on the optimal beam information, the STA 200 can transmit uplink data and the AP 100 can receive the uplink data.

In an embodiment, the optimal beam pair can be selected based on a power (or signal strength) measurement result of each beam pair or beam pair. In another embodiment, the optimal beam pair can be selected based on a channel capacity measurement result of each beam pair or beam pair.

The above-stated steps 605 through 625 correspond to the first phase of the beam selecting operation according to embodiments of the present invention, and step 630 corresponds to the second phase.

Figure 7:
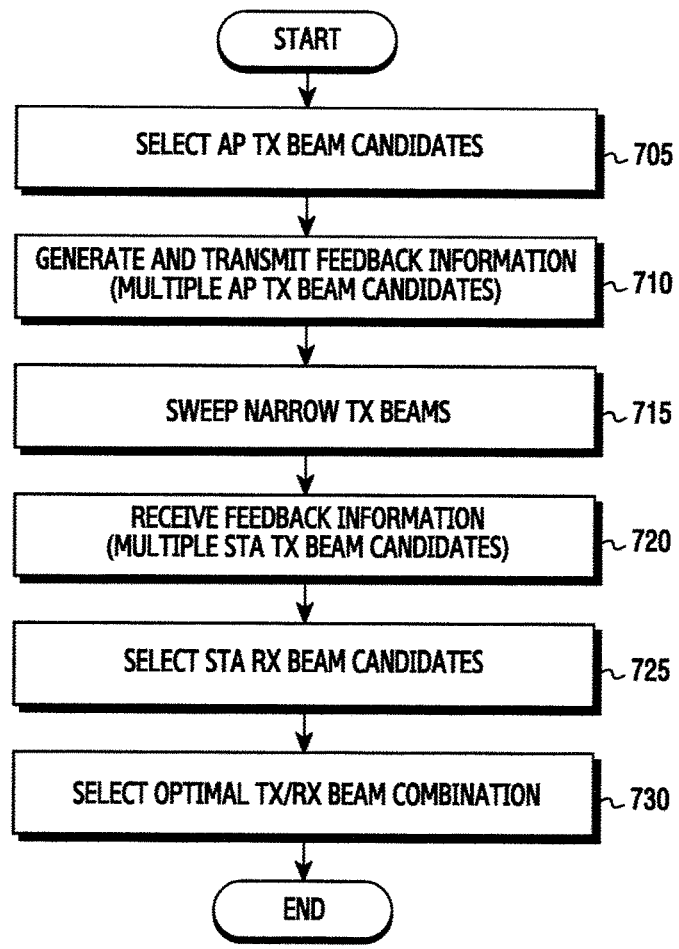
FIG. 7 is a diagram illustrating a processing procedure of a beam selecting operation by a receiving device of a MIMO system according to embodiments of the present invention.

FIG. 7 is a diagram showing a processing procedure of a beam selecting operation by a receiving device of a MIMO system according to embodiments of the present invention. This processing flow corresponds to operations for selecting an optimal beam when the receiving device is the terminal of FIG. 1A or the STA 200.

Referring to FIG. 7, in step 705, when the AP 100 conducts AP-TXSS, the STA 200 selects a plurality of AP candidate TX beams from a plurality of AP TX beams. When the AP 100 transmits a particular signal (e.g., a preamble) while sweeping relatively narrow beams, the STA 200 receives the signal from the AP 100 in the quasi-omni mode and selects the narrow TX beams of the AT as the candidate beams.

In step 710, the STA 200 generates feedback information with information about the selected AP candidate TX beams and feeds the information back to the AP 100.

In step 715, the STA 200 performs STA-TXSS. Next, the AP 100 selects a plurality of STA candidate TX beams from the STA TX beams. When the STA 200 transmits a particular signal (e.g., a preamble) while sweeping relatively narrow beams, the AP 100 receives the signal from the STA 200 in the quasi-omni mode and selects the narrow TX beams of the STA as the candidate beams.

In step 720, the STA 200 receives feedback information of the STA candidate TX beams selected by the AP 100, from the AP 100.

In step 725, the STA 200 conducts STA-RXSS and selects a plurality of STA candidate RX beams from a plurality of STA RX beams. For the STA-RXSS, when the AP 100 sends a signal in the quasi-omni mode or using the beamforming, the STA 200 receives the signal from the AP 100 by changing the beam and thus selects narrow RX beams of the STA as candidate beams. When beam reciprocity exists between a downlink beam and an uplink beam, the STA-RXSS 725 may not be performed.

In step 730, the STA 200 selects an optimal TX/RX beam pair. The STA 200 performs one-shot beam training using the TX/RX beam pairs and selects the optimal TX/RX beam pair for MIMO communication. For example, the STA 200 selects an optimal AP TX beam/STA RX beam pair from pairs of its RX beams and the TX beams of the AP 100.

In an embodiment, the STA 200 can select an optimal downlink beam pair to be used to transmit data from the AP 100 to the STA 200 amongst the beam pairs of the TX beam candidates of the AP 100 and the RX beam candidates of the STA 200. For example, the STA 200 can determine the optimal downlink beam pair based on one of the signal strength and the channel capacity of the beam pairs. The STA 200 can feed information about the optimal downlink beam pair back to the AP 100.

Next, the AP 100 receives from the STA 200 the information about the optimal downlink beam pair to be used to transmit data from the AP 100 to the STA 200 among the beam pairs of the TX beam candidates of the AP 100 and the RX beam candidates of the STA 200. Thus, based on the optimal beam information, the AP 100 can transmit downlink data and the STA 200 can receive the downlink data.

In an embodiment, the optimal beam pair can be selected based on a power measurement result of each beam pair or beam pair. In another embodiment, the optimal beam pair can be selected based on a channel capacity measurement result of each beam pair or beam pair.

The above-stated steps 705 through 725 correspond to the first phase of the beam selecting operation according to embodiments of the present invention, and step 730 corresponds to the second phase.

Figure 8:
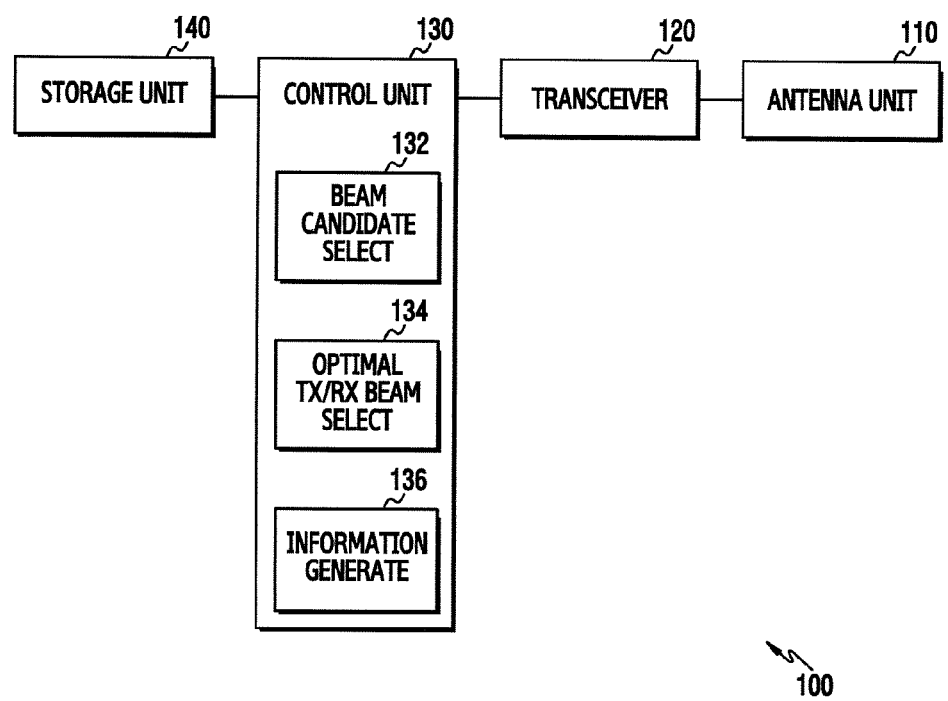
FIG. 8 is a diagram showing a structure of a transmitting device of a MIMO system according to embodiments of the present invention.

FIG. 8 is a diagram showing a structure of a transmitting device (transmitting node) of a MIMO system according an embodiments of the present invention. For example, the transmitting device of the MIMO system can be the base station of FIG. 1A or the AP 100.

Referring to FIG. 8, the transmitting device (transmitting node) includes an antenna unit 110, a transceiver 120, a control unit 130, and a storage unit 140.

The antenna unit 110 transmits a signal transmit-processed by the transceiver 120 over a radio channel, and receives a signal over the radio channel. The antenna unit 110 can include a plurality of antennas, an array antenna, or antenna elements, for supporting the beamforming.

The transceiver 120 transmit-processes a transmit signal and receive-processes a received signal. For example, the transceiver 120 performs a conversion function between a baseband signal and a bit stream according to a physical layer standard of a system. For data transmission, the transceiver 120 generates complex symbols by encoding and modulating a transmit bit stream. In so doing, the transceiver 120 can map the complex symbols to subcarriers, and generate Orthogonal Frequency Division Multiplexing (OFDM) symbols through an Inverse Fast Fourier Transform (IFFT) operation. In data reception, the transceiver 120 restores a receive bit stream by demodulating and decoding a baseband signal. Also, the transceiver 120 up-converts the baseband signal to a Radio Frequency (RF) band signal, transmits the RF band signal via the antenna unit 110, and down-converts an RF band signal received via the antenna unit 110 to a baseband signal. For example, the transceiver 120 can include a transmit filter, a receive filter, an amplifier, a mixer, an oscillator, a Digital to Analog Convertor (DAC), an Analog to Digital Convertor (ADC), and the like.

Also, the transceiver 120 can include a plurality of RF chains. In addition, the transceiver 120 can support the beamforming. For the beamforming, the transceiver 120 can adjust a phase and a magnitude of signals transmitted and received via the antennas or the antenna elements of the antenna unit 110. Also, the transceiver 120 can precode a plurality of data streams transmitted. Hence, the transmitting device can perform Multi-User (MU)-MIMO. The transceiver 120 sends and receives the signals as mentioned above. Such a transceiver 120 can be referred to as a communication unit or a transceiving unit, and in some cases, can be divided into a transmitter and a receiver or into a transmitting unit and a receiving unit.

The storage unit 140 stores a basic program for the operations of the transmitting device, an application program, and data such as setting information. Also, the storage unit 140 provides the stored data according to a request of the control unit 130.

The control unit 130 controls general operations of the transmitting device (transmitting node). For example, the control unit 120 transmits/receives signals through the transceiver 120. Also, the control unit 130 records data in the storage unit 140 and reads the recorded data from the storage unit 140. For doing so, the control unit 130 can include at least one processor.

For the beam selecting and feedback operations according to embodiments of the present invention, the control unit 130 includes a beam candidate selecting module 132, an optimal TX/RX beam selecting module 134, and an information generating module 136.

The beam candidate selecting module 132 selects at least one TX beam candidate from the TX beams and at least one RX candidate from the RX beams.

In a first embodiment, the beam candidate selecting module 132 selects a predefined number of beam candidates selected based on the signal strength among the beams, as the beam candidates.

In a second embodiment, the beam candidate selecting module 132 selects beams of the signal strength over a particular threshold, as beam candidates among the beams.

In a third embodiment, the beam candidate selecting module 132 selects a predefined number of beams as beam candidates from the beams having the signal strength over a particular threshold.

In a fourth embodiment, the beam candidate selecting module 132 selects beams of a predefined range as beam candidates from the beams based on the beam of the maximum signal strength.

In a fifth embodiment, the beam candidate selecting module 132 selects a predefined number of beams within a predefined range, as beam candidates from the beams based on the beam of the maximum signal strength.

In a sixth embodiment, the beam candidate selecting module 132 selects beams exceeding a second threshold, as beam candidates from the beams of the signal strength exceeding a first threshold among the beams.

The optimal TX/RX beam selecting module 134 determines an optimal beam pair from pairs of the TX beam candidates and the RX beam candidates. In an embodiment, when the transmitting node is the AP 100 and the receiving node is the STA 200, the optimal TX/RX beam selecting module 134 can select an optimal uplink beam pair to be used to receive data transmitted from the STA 200 to the AP 100 among beam pairs of the TX beam candidates of the STA 200 and the RX beam candidates of the AP 100. For example, the optimal TX/RX beam selecting module 134 can select the optimal uplink beam pair from the beam pairs based on one of the signal strength and the channel capacity of the beam pairs of the candidates. The AP 100 can feed information about the optimal uplink beam pair back to the STA 200.

Next, the STA 200 receives from the AP 100 the information about the optimal uplink beam pair to be used to transmit data from the STA 200 to the AP 100 among the beam pairs of the TX beam candidates of the STA 200 and the RX beam candidates of the AP 100. Hence, based on the optimal beam information, the STA 200 can transmit uplink data and the AP 100 can receive the uplink data.

In an embodiment, the optimal TX/RX beam selecting module 134 can select the optimal beam pair based on the power (or signal strength) measurement result of each beam pair or beam pair. In another embodiment, the optimal TX/RX beam selecting module 134 can select the optimal beam pair based on the channel capacity measurement result of each beam pair or beam pair.

The information generating module 136 generates various beam sweeping information and feedback information regarding the beam selecting operation according to embodiments of the present invention. The generated information is provided to the receiving device (receiving node) via the transceiver 120 and the antenna 110. For example, in association with the beam candidate selecting module 132, the information generating module 136 can generate the transmitting node TX beam sweeping information (e.g., AP-TXSS), receiving node TX beam sweeping feedback information (e.g., STA-TXSS Feedback), and transmitting node RX beam sweeping information (e.g., AP-RXSS). For example, in association with the optimal TX/RX beam selecting module 134, the information generating module 136 generates the information about the optimal uplink beam pair to be used to receive data transmitted from the receiving node to the transmitting node among the beam pairs of the TX beam candidates of the receiving node and the RX beam candidates of the transmitting node.

Figure 9:
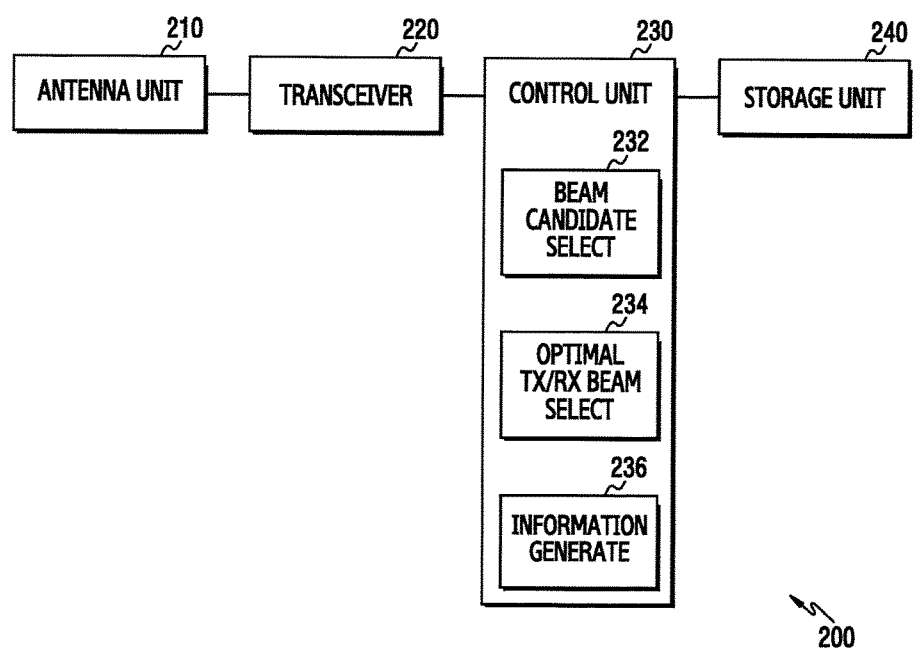
FIG. 9 is a diagram showing a structure of a receiving device of a MIMO system according to embodiments of the present invention.

FIG. 9 is a diagram showing a structure of a receiving device (receiving node) of a MIMO system according to embodiments of the present invention. For example, the receiving device of the MIMO system can be the terminal of FIG. 1A or the STA 200.

Referring to FIG. 9, the receiving device (receiving node) includes an antenna unit 210, a transceiver 220, a control unit 230, and a storage unit 240.

The antenna unit 210 transmits a signal transmit-processed by the transceiver 220 over a radio channel, and receives a signal over the radio channel. The antenna unit 210 can include a plurality of antennas, an array antenna, or antenna elements, for supporting the beamforming.

The transceiver 220 transmit-processes a transmit signal and receive-processes a received signal. For example, the transceiver 220 performs a conversion function between a baseband signal and a bit stream according to a physical layer standard of a system. For data transmission, the transceiver 220 generates complex symbols by encoding and modulating a transmit bit stream. In data reception, the transceiver 220 restores a receive bit stream by demodulating and decoding a baseband signal. In so doing, the transceiver 220 can split the received signal to OFDM symbols and restore complex symbols per subcarrier by applying an FFT operation to the OFDM symbols. Also, the transceiver 220 up-converts the baseband signal to an RF band signal, transmits the RF band signal via the antenna unit 210, and down-converts an RF band signal received via the antenna unit 210 to a baseband signal. For example, the transceiver 220 can include a transmit filter, a receive filter, an amplifier, a mixer, an oscillator, a DAC, an ADC, and the like.

Also, the transceiver 220 can include a plurality of RF chains. In addition, the transceiver 220 can perform the beamforming. For the beamforming, the transceiver 220 can adjust a phase and a magnitude of signals transmitted and received via the antennas or the antenna elements. The transceiver 220 sends and receives the signals as mentioned above. Such a transceiver 220 can be referred to as a communication unit or a transceiving unit, and in some cases, can be divided into a transmitter and a receiver or into a transmitting unit and a receiving unit.

The storage unit 240 stores a basic program for the operations of the receiving device, an application program, and data such as setting information. Also, the storage unit 240 provides the stored data according to a request of the control unit 230.

The control unit 230 controls general operations of the terminal. For example, the control unit 230 transmits/receives signals through the transceiver 220. Also, the control unit 230 records and reads data in and from the storage unit 240. For doing so, the control unit 230 can include at least one processor. For example, the control unit 230 can include a Communication Processor (CP) for controlling the communication and an Application Processor (AP) for controlling a higher layer such as an application program.

For the beam selecting and feedback operations according to embodiments of the present invention, the control unit 230 includes a beam candidate selecting module 232, an optimal TX/RX beam selecting module 234, and an information generating module 236.

The beam candidate selecting module 232 selects at least one TX beam candidate from the TX beams and at least one RX candidate from the RX beams.

In a first embodiment, the beam candidate selecting module 232 selects a predefined number of beam candidates selected based on the signal strength among the beams.

In a second embodiment, the beam candidate selecting module 232 selects beams of the signal strength over a particular threshold, as beam candidates among the beams.

In a third embodiment, the beam candidate selecting module 232 selects a predefined number of beams as beam candidates from the beams having the signal strength over a particular threshold among the beams.

In a fourth embodiment, the beam candidate selecting module 232 selects beams of a predefined range as beam candidates from the beams based on the beam of the maximum signal strength among the beams.

In a fifth embodiment, the beam candidate selecting module 232 selects a predefined number of beams within a predefined range, as beam candidates from the beams based on the beam of the maximum signal strength among the beams.

In a sixth embodiment, the beam candidate selecting module 232 selects beams exceeding a second threshold, as beam candidates from the beams of the signal strength exceeding a first threshold among the beams.

The optimal TX/RX beam selecting module 234 determines an optimal beam pair from pairs of the TX beam candidates and the RX beam candidates. In an embodiment, when the transmitting node is the AP 100 and the receiving node is the STA 200, the optimal TX/RX beam selecting module 234 can select an optimal downlink beam pair to be used to receive data transmitted from the AP 100 to the STA 200 among beam pairs of the TX beam candidates of the AP 100 and the RX beam candidates of the STA 200. For example, the optimal TX/RX beam selecting module 234 can select the optimal downlink beam pair based on one of the signal strength and the channel capacity of the beam pairs. The STA 200 can feed information about the optimal downlink beam pair back to the AP 100.

Next, the AP 100 receives from the STA 200 the information about the optimal downlink beam pair to be used to transmit data from the AP 100 to the STA 200 among the beam pairs of the TX beam candidates of the AP 100 and the RX beam candidates of the STA 200. Hence, based on the optimal beam information, the AP 100 can transmit downlink data and the STA 200 can receive the downlink data.

In an embodiment, the optimal TX/RX beam selecting module 234 can select the optimal beam pair based on the power (or signal strength) measurement result of each beam pair or beam pair. In another embodiment, the optimal TX/RX beam selecting module 234 can select the optimal beam pair based on the channel capacity measurement result of each beam pair or beam pair.

The information generating module 236 generates various beam sweeping information and feedback information regarding the beam selecting operation according to embodiments of the present invention. The generated information is provided to the transmitting device (transmitting node) via the transceiver 220 and the antenna 210. For example, in association with the beam candidate selecting module 232, the information generating module 236 can generate the receiving node TX beam sweeping information (e.g., STA-TXSS), transmitting node TX beam sweeping feedback information (e.g., AP-TXSS Feedback), and receiving node TX beam sweeping information (e.g., STA-RXSS). For example, in association with the optimal TX/RX beam selecting module 234, the information generating module 236 generates the information about the optimal downlink beam pair to be used to transmit data from the transmitting node to the receiving node among the beam pairs of the TX beam candidates of the transmitting node and the RX beam candidates of the receiving node.

Hereafter, specific embodiments of the present invention shall be described. FIG. 10 through FIG. 17 are diagrams illustrating a beam selecting operation according to a first scheme. The first scheme includes the processing procedure (FIG. 10) of the MIMO beam selecting operation, various beam sweeping information and feedback information (FIGS. 11 through 16), and the processing procedure (FIG. 17) of the optimal TX/RX beam pair selecting operation. A second scheme includes the processing procedure (FIG. 18) of the MIMO beam selecting operation, and the beam sweeping information (FIGS. 19A through 19B). The second scheme includes only the procedure and the information different from the procedure and the information according to the first scheme. A third scheme includes the processing procedure (FIG. 20) of the MIMO beam selecting operation. The third scheme includes only the procedure different from the procedure according to the first scheme. A fourth scheme includes the beam sweeping feedback information (FIGS. 21 through 22). A fifth scheme includes the beam sweeping information and the beam sweeping feedback information (FIGS. 23 through 25). The fourth scheme and the fifth scheme include only the information different from the information according to the first scheme. The first scheme through the fifth scheme to be explained are arranged in the following Table 1.

TABLE 1

| | Contents |
|---|---|
| Scheme 1 | TXSS/RXSS pair structure |
| | (1) First phase |
| | AP-TXSS, AP-TXSS feedback/STA-TXSS, STA-TXSS feedback |
| | AP-TXSS, STA-RXSS, AP-RXSS |
| | (2) Second phase: Select MIMO beam |
| Scheme 2 | Simplify first phase of scheme 2 to scheme 1 |
| | (1) First phase |
| | AP-TXSS, AP-TXSS feedback/STA-TXSS, STA-TXSS feedback/STA-RXSS, AP-RXSS |
| | (2) Second phase: Select MIMO beam |
| Scheme 3 | Minimize procedure (using beam reciprocity) |
| | (1) First phase |
| | AP-TXSS, AP-TXSS feedback/STA-TXSS, STA-TXSS feedback |
| | (2) Second phase: Select MIMO beam |
| Scheme 4 | Feedback information reduction method |
| Scheme 5 | Information bit reduction method using space multiplexing |

FIG. 10 is a diagram illustrating a processing procedure of a beam selecting operation according to an embodiment of the present invention. Herein, while the MIMO beam selecting operation is explained as an example conducted in a beacon interval as a superframe according to the IEEE 802.11ad, the scope of the present invention is not limited to this.

Referring to FIG. 10, one beacon interval 1000 includes a BTI period 1001, an Association Beamforming Training (A-BFT) period 1002, an Announcement Time (AT) period 1003 for providing an access opportunity, and a Data Transfer Time (DTT) period 1004 for data transmission/reception. The DTT period 1004 includes Contention Based Access Periods (CBAPs) and non-contention based scheduled Service Periods (SPs).

An operation 1000-1 of the first phase for the MIMO beam selection is conducted in the BTI period 1001 and the A-BFT period 1002, where a plurality of narrow beam candidates is selected. An operation 1000-2 of the second phase for the MIMO beam selection is conducted in the DTT period 1004, where the optimal TX/RX beam is selected. The operation of the first phase shall be described by referring to FIG. 10, and the operation of the second phase shall be described in detail by referring to FIG. 17.

The first phase 1000-1 includes the process for selecting the narrow TX beam candidates of the AT and the STA through AP-TXSS 1010, AP-TXSS feedback and STA-TXSS 1020, and STA-TXSS feedback 1030. Also, the first phase 1000-1 includes the process for selecting the narrow TX beam candidates of the AT and the STA through the AP-TXSS 1010, STA-RXSS 1040, and AP-RXSS 1050. The AP-TXSS 1010 can be conducted in the BTI period 1001. In one slot (e.g., ScS slot #2) of the A-BFT period 1002, the AP-TXSS feedback and the STA-TXSS 1020 can be executed, and the STA-TXSS feedback 1030 can be executed. Also, the STA-RXSS 1040 and the AP-RXSS 1050 can be executed in another slot (e.g., ScS slot #m) of the A-BFT period 1002.

First, the process for selecting the narrow TX beam candidates of the AP and the STA is explained.

In the AP-TXSS process 1010, the AP 100 changes (sweeps) and transmits the narrow TX beams. The STA 200 receives the beam from the AP 100 in the quasi-omni mode and selects a plurality of narrow TX beam candidates of the AP 100. Herein, provided that the number of TX beams of the AP 100 is NT, the STA 200 selects nt-ary beams from NT. In an embodiment, the STA 200 can select the nt-ary beams from NT in order of the signal strength. A method for selecting the beam candidates can be realized variously, and such methods shall be described.

In an embodiment, a TX array antenna of the AP 100 can concurrently perform the TXSS per antenna. For the TX array antenna of the AP 100 to concurrently perform the TXSS, information (e.g., preamble) for identifying the TX antenna needs to be defined so that the STA 200 can identify the TX antenna. In another embodiment, the TX array antenna of the AP 100 can sequentially perform TXSS as many as the antennas in the form of Single Input Multiple Output (SIMO).

An example of information required for selecting the narrow TX beams of the AP 100 in the AP-TXSS process 1010 is shown in FIG. 11. Herein, while two RF chains and two array antennas are exemplified, the scope of the present invention is not limited to this. AP-TXSS enables TX diversity transmission.

Referring to FIG. 11, AP-TXSS information 1100 includes Direction, CDOWN, and Antenna ID and Sector ID per RF chain. Direction is an indicator indicating a forward link or a reverse link. CDOWN indicates the number of remaining beams (or sectors) which are not beam-swept. Antenna ID indicates an antenna index currently transmitting. Sector ID indicates a beam (or sector) index currently transmitting. For example, Direction can include 9 bits, Antenna ID can include 2 bits, and Sector ID can include 9 bits.

In the STA-TXSS/AP-TXSS feedback process 1020, the STA 200 changes (sweeps) and transmits narrow TX beams. The AP 100 receives the beam from the STA 200 in the quasi-omni mode and selects a plurality of narrow TX beam candidates of the STA 200. Also, in the STA-TXSS/AP-TXSS feedback process 1020, the STA 200 feeds back the narrow beam candidates estimated through the AP-TXSS 100. Herein, provided that the number of TX beams of the STA 200 is MT, the AP 100 selects mt-ary beams from MT. In an embodiment, the AP 100 can select the mt-ary beams from the MT in order of the signal strength. A method for selecting the beam candidates can be realized variously, and such methods shall be described.

In an embodiment, a TX array antenna of the STA 200 can concurrently perform the TXSS per antenna. For the TX array antenna of the STA 200 to concurrently perform the TXSS, information (e.g., preamble) for identifying the TX antenna needs to be defined so that the AP 100 can identify the TX antenna. In another embodiment, the TX array antenna of the AP 100 can sequentially perform TXSS as many as the antennas in the form of the SIMO.

An example of necessary information and feedback information for feeding back the beam candidates of the AP 100 when the STA 200 conducts TXSS in the STA-TXSS/AP-TXSS feedback process 1020 is shown in FIG. 12 and FIG. 13. Herein, while two RF chains and two array antennas are exemplified, the scope of the present invention is not limited to this. The STA-TXSS enables TX diversity transmission.

Referring to FIG. 12, STA-TXSS information 1200 includes Direction, CDOWN, and Antenna ID and Sector ID per RF chain. Direction is an indicator indicating a forward link or a reverse link. CDOWN indicates the number of remaining beams (or sectors) which are not beam-swept. Antenna ID indicates an antenna index currently transmitting. Sector ID indicates a beam (or sector) index currently transmitting. For example, Direction can include 1 bit, CDOWN can include 9 bits, Antenna ID can include 2 bits, and Sector ID can include 6 bits.

Referring to FIG. 13, AP-TXSS feedback information 1300 includes Antenna select, Sector select, and SNR report per RF chain. Antenna select indicates an ID of the selected antenna. A plurality of Sector selects indicates information about candidate beams for the antenna of the AP 100. Sector select_1 indicates first candidate beam information for the antenna of the AP 100, and Sector select_nt indicates nt-th candidate beam information for the antenna of the AP 100. A plurality of SNR reports indicates an SNR value of each Sector select. SNR report_1 indicates the SNR value of Sector select_1, and SNR report nt indicates the SNR value of Sector select_nt. For example, Antenna select can include 2 bits, each Sector select can include 6 bits, and each SNR report can include 8 bits.

In the STA-TXSS feedback processor 1030, the AP 100 feeds back the estimated MT-ary narrow TX beam candidates of the STA 200. In so doing, the AP 100 can use any one of the nt-ary narrow TX beam candidates of the AP received in the STA-TXSS/AP-TXSS feedback process 1020. For example, the AP 100 can use utilize the beam index of the maximum signal strength among the narrow TX beam candidates. The STA 200 receives the narrow TX beam candidates of the STA 200 in the quasi-omni mode.

Referring to FIG. 14, STA-TXSS feedback information 1400 includes Antenna select, Sector select, and SNR report per RF chain. Antenna select indicates an ID of the selected antenna. A plurality of Sector select indicates information about candidate beams for the antenna of the STA 200. Sector select_1 indicates first candidate beam information for the antenna of the STA 200, and Sector select_mt indicates mt-th candidate beam information for the antenna of the STA 200. A plurality of SNR reports indicates an SNR value of each Sector select. SNR report_1 indicates the SNR value of Sector select_1, and SNR report_mt indicates the SNR value of Sector select_mt. For example, Antenna select can include 2 bits, each Sector select can include 6 bits, and each SNR report can include 8 bits.

Next, the process for selecting narrow RX beam candidates of the AP and the STA is described.

When the narrow TX beam candidates are selected, a plurality of narrow RX beam candidates is selected in the AP-TXSS process 1010, the STA-RXSS process 1040, and the AP-RXSS process 1050.

For the AP-RXSS process 1050, the AP-TXSS 1010 is conducted first. In the AP-TXSS process 1010, the AP 1010 changes (sweeps) and transmits narrow TX beams. The STA 200 receives the beam from the AP 100 in the quasi-omni mode, and selects narrow TX beam candidates of the AP. Herein, provided that the number of the TX beams of the AP 100 is NT, the STA 200 selects nt-ary beams from NT.

In the STA-RXSS process 1040, the AP 100 transmits a signal using the quasi-omni mode or the beamforming. The STA 200 selects narrow RX beam candidates of the STA 200 while sweeping the beam. When the AP 100 sends the signal using the beamforming, the AP 100 can use the beam of the maximum signal strength. Provided that the number of the RX beams of the STA 200 is MR, the STA 200 selects mr-ary beams from MR. In an embodiment, the STA 200 can select the mr-ary beams from MR in order of the signal strength. An example of the information for the STA-RXSS is shown in FIG. 15.

Referring to FIG. 15, STA-RXSS information 1500 includes Direction and CDOWN. Direction is an indicator indicating a forward link or a reverse link. CDOWN indicates the number of remaining beams (or sectors) which are not beam-swept. For example, Direction can include 1 bit, and CDOWN can include 9 bits.

In the AP-RXSS process 1050, the STA 200 transmits a signal using the quasi-omni mode or the beamforming. The AP 100 selects narrow RX beam candidates of the AP 100 while sweeping the beam. When the STA 200 sends the signal using the beamforming, the STA 200 can use the beam of the maximum signal strength. Provided that the number of the RX beams of the AP 100 is NR, the AP 100 can select nr-ary beams from NR based on the signal strength. An example of the information for the AP-RXSS is shown in FIG. 16.

Figure 16:
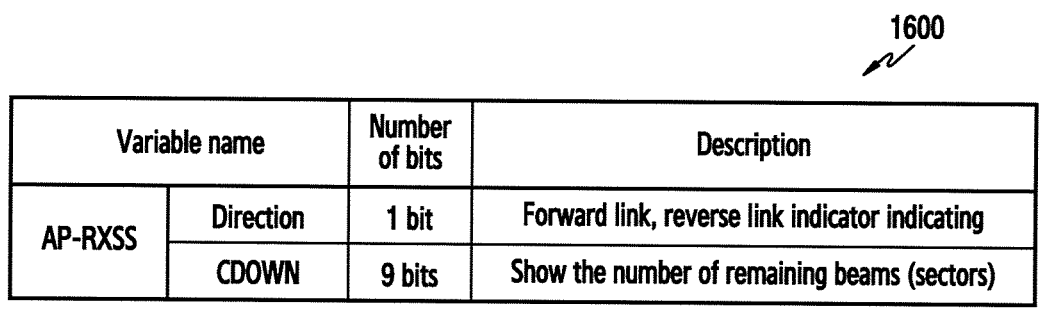
FIG. 16 is a diagram showing AP-RXSS information according to an embodiment of the present invention.

Referring to FIG. 16, AP-RXSS information 1600 includes Direction and CDOWN. Direction is an indicator indicating a forward link or a reverse link. CDOWN indicates the number of remaining beams (or sectors) which are not beam-swept. For example, Direction can include 1 bit, and CDOWN can include 9 bits.

As stated above, the AP 100 and the STA 200 each select the downlink/uplink beam candidates through the first phase. Methods for selecting the beam candidates are as follows.

A first method selects n-ary (at least 1, up to NT, NR, MT, or MR) fixed beams based on the signal stregnth. Herein, NT denotes the number of the TX beams of the AP 100, NR denotes the number of the RX beams of the AP 100, MT denotes the number of the TX beams of the STA 200, and MR denotes the number of the RX beams of the STA 200. When the fixed n-ary beams are selected, a length of a training (TRN) period is fixed in the second phase and thus operational convenience can be attained.

A second method selects all of beams having the signal strength exceeding a particular threshold. When the first method selects the fixed n-ary beams, some beams can have the signal strength of a noise level and accordingly the beams over the particular threshold can be selected to mitigate complexity. Since the number of the narrow beam candidates is not fixed, the length of the TRN period in the second phase needs to be flexible for the sake of the second method.

A third method selects beams over a particular threshold but limits beams (up to p) not to select too many beams. The third method can make the length of the TRN period flexible but limit to a period for training up to p-ary beams.

A fourth method selects beams of a certain range as candidates against the beam of the maximum signal strength.

A fifth method selects beams of a certain range against the beam of the maximum signal strength and selects only up to p-ary beams.

A sixth method determines beam candidates by defining multiple thresholds. In an embodiment, a first threshold is used to primarily select beams over a noise level, a second threshold is used to select the beam candidates, and thus the beam candidate selection can be optimized.

Figure 17:
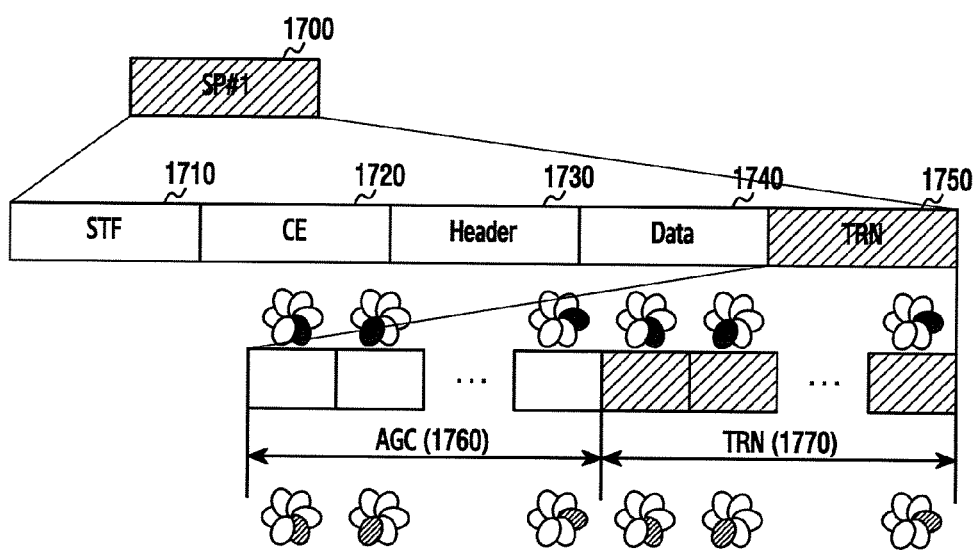
FIG. 17 is a diagram illustrating a processing procedure of an optimal transmit/receive beam pair selecting operation according to an embodiment of the present invention.

FIG. 17 is a diagram showing a processing procedure of an optimal transmit/receive beam pair selecting operation according to an embodiment of the present invention. Here, while the optimal transmit/receive beam pair selecting operation is explained as an example in a beacon interval as a superframe according to the IEEE 802.11ad standard, the scope of the present invention is not limited to this. The optimal transmit/receive beam pair for MIMO can be selected as the second phase operation 1000-2 is executed in the DTT period 1004 of the beacon interval 1000 of FIG. 10. For example, the second phase operation 1000-2 can be performed in the SP2 of the DTT period 1004.

Referring to FIG. 17, a SP 1700 includes a field 1710, a field 1720, a field 1730, a field 1740, and a field 1750. The field 1710 is a Short Training Field (STF) for obtaining time and frequency synchronization. The field 1720 is a Channel Estimation (CE) field for channel estimation. The field 1730 is a header field. The field 1740 is a data field. The field 1750 is a TRN field for beam refinement. The field 1750 includes an Automatic Gain Control (AGC) period 1760 for measuring a receive power per beam, and a TRN period 1770 for the beam training.

The IEEE 802.11ad standard operates the beam TRN period as a training receive beamforming (TRN-R) for RX beam training and training transmit beamforming (TRN-T) for TX beam training. On the contrary, the second phase operation 1000-2 fulfills the MIMO beam selection through the one-shot beam training process which selects the beam using the TX/RX beamforming. The TRN period 1770 needs to be pre-defined according to the above-mentioned beam candidate selecting scheme.

When the multiple narrow TX/RX candidate beams of the AP 100 and the STA 200 are selected in the first phase 1000-1, the second phase 1000-2 conducts the one-shot beam training using a plurality of beam pairs. As the second phase operation 1000-2 is performed, an optimal TX/RX beam for the MIMO communication of the AP 100 and the STA 200 is selected. The second phase operation 1000-2 can be divided into a MIMO beam selecting operation for a downlink (DL) and a MIMO beam selecting operation for an uplink (UL).

First, the STA 200 performs the MIMO beam selecting operation for the DL.

In a TRN period 1770, the STA 200 selects an optimal DL MIMO beam with respect to a DL beam pair (nt, mr) selected in the first phase 1000-1. Herein, nt denotes the number of the TX candidate beams of the AP 100, and mr denotes the number of the RX candidate beams of the STA 200. A length of the TRN period 1770 can be defined by (nt)×(mr). The order of beam indexes in the TRN period can be arranged in order of the SNR among beam indexes fed back in the first phase 1000-1.

The optimal DL MIMO beam can be selected based on a power measurement result or a capacity measurement result for each DL beam pair.

In an embodiment, the optimal DL MIMO beam can be selected based on the power measurement result for each DL beam pair based on Equation 1.

$$DL(\hat{n}t\hat{m}r) = \underset{nt,mr}{\mathrm{argmax}} P_{nt,mr} \quad P_{nt,mr} = |H_{nt,mr}|^2 \qquad \text{Equation 1}$$

Here, $\hat{n}t$ and $\hat{m}r$ denote optimal TX and RX beam indexes estimated based on Equation 1. $H_{nt,mr}$ and $DL(\hat{n}t\hat{m}r)$ denote a channel gain generated with the TX beam index nt and the RX beam index mr and an optimal DL TX and RX beam pair.

In another embodiment, the optimal DL MIMO beam can be selected based on the capacity measurement result for each DL beam pair based on Equation 2.

$$DL(\hat{n}t\hat{m}r) = \underset{nt,mr}{\operatorname{argmax}} C_{nt,mr} \qquad \text{Equation 2}$$

$$C_{nt,mr} = \log_2 \det\left(I + \frac{E_x}{N_T N_0} H_{nt,mr} H_{nt,mr}^H\right)$$

Here, $C_{nt,mr}$ is the channel capacity measurement result for the DL beam pair (nt, mr), and a beam pair having the maximum channel capacity is selected as the DL optimal beam pair.

Next, the AP 100 can be divided into the MIMO beam selecting operation for the UL.

In the TRN period 1770, the AP 100 selects an optimal UL MIMO beam with respect to a UL beam pair (mt, nr) selected in the first phase 1000-1. Herein, mt denotes the number of the TX candidate beams of the STA 200, and nr denotes the number of the RX candidate beams of the AP 100. The length of the TRN period 1770 can be defined by (mt)×(nr). The order of the beam indexes in the TRN period can be arranged in order of the SNR among the beam indexes fed back in the first phase 1000-1.

The optimal UL MIML beam can be selected based on a power measurement result or a capacity measurement result for each UL beam pair.

In an embodiment, the optimal UL MIMO beam can be selected based on the power measurement result for each beam pair based on Equation 3.

$$UL(\hat{n}r\hat{m}t) = \underset{nr,mt}{\operatorname{argmax}} P_{nr,mt} \quad P_{nr,mt} = |H_{nr,mt}|^2 \qquad \text{Equation 3}$$

Here, UL($\hat{n}r\hat{m}t$) denotes an optimal UL TX and RX beam pair.

In another embodiment, the optimal UL MIMO beam can be selected based on the capacity measurement result for each beam pair based on Equation 4.

$$UL(\hat{n}r\hat{m}t) = \underset{nr,mt}{\operatorname{argmax}} C_{nr,mt} \qquad \text{Equation 4}$$

$$C_{nr,mt} = \log_2 \det\left(I + \frac{E_x}{N_T N_0} H_{nr,mt} H_{nr,mt}^H\right)$$

Here, the channel capacity $C_{nt,mr}$ for the UL beam pair (nr, mt) is measured, and the UL beam pair (nr, mt) having the maximum $C_{nt,mr}$ is obtained and selected as an optimal UL beam pair UL($\hat{n}r\hat{m}t$).

As stated above, the MIMO beam selecting scheme according to an embodiment of the present invention is carried out in the two steps of the first phase and the second phase. Such a MIMO beam selecting scheme can be arranged as shown in Table 2, compared with the beam selecting scheme of IEEE 802.11ad.

TABLE 2

|  |  | IEEE 802.11 ad | Pre5G/post 11 ad |
|---|---|---|---|
|  | Procedure | 1. Provide procedure for SISO<br>2. Divide TXSS RXSS<br>3. Always perform $1^{st}$ phase and $2^{nd}$ phase together<br>4. For MIMO extention - SISO procedure is required to perform sequential 4 BIT(400 ms) (in case of 2 × 2) | 1. Provide procedure including MIMO<br>2. Pair type of TXSS and RXSS<br>3. $1^{st}$ phase - long term operation periodicity<br>$2^{nd}$ phase - short term operation periodicity<br>4. Perform all in 1 BIT(100 ms) section |
| $1^{st}$ phase | Beam pattern<br>Beam selection process<br>Feedback | Broad beam pattern<br>Select optimal beam<br><br>Report optimal beam | Narrow beam pattern<br>Select multiple candidate beam<br>Report multiple candidate beam |
|  | Multiple beam candidate selection methods | — | 1. Select fixed n (SNR base max: n)<br>2. Select a specific threshold over (min: 1 max: number of max beam)<br>3. Up to p of the above specific thresholds (min: 1, max: p)<br>4. Select the candidate beam compared with max beam (min: 1, max: number of max beam)<br>5. Select up to p compared with max beam (min: 1, max: p)<br>6. Use multi threshold. (ex: threshold 1: noise level, threshold 2: signal level) |
| $2^{nd}$ phase |  | 1. Length of TRN: fixed<br>2. TRN-R or TRN-T operation | 1. (according to beam pair) The length of TRN is variable.<br>2. One-shot beam training |

The embodiments of the present invention can minimize overhead of the beam TRN period for the beam selection.

The embodiments of the present invention are robust to the blocking of the selected beam. According to the IEEE 802.11ad standard, when the selected beam is blocked, a new beam should be selected by sequentially conducting the SLS procedure and the BRP procedure from the beginning. However, although the selected beam is blocked, the embodiments of the present invention only need to execute the second phase which determines the optimal beam pair with the beam candidates selected in the first phase.

The embodiments of the present invention can reduce overhead of the beam training signal and the reception complexity.

FIG. 18 is a diagram showing a processing procedure of a MIMO beam selecting operation according to another embodiment of the present invention. Here, while the MIMO beam selecting operation is explained as an example in a beacon interval as a superframe according to the IEEE 802.11ad standard, the scope of the present invention is not limited to this.

Referring to FIG. 18, this embodiment corresponds to the second scheme of the MIMO beam selection which joins the TXSS and the RXSS, compared with the first scheme of FIG. 10. The second scheme omits the second AP-TXSS of the first scheme, and joins the STA-TXSS feedback process and the STA-RXSS process. A first phase 1800-1 for selecting a plurality of narrow beam candidates is conducted in order of AP-TXSS 1810, AP-TXSS feedback/STA-TXSS 1820, STA-TXSS feedback/STA-RXSS 1830, and AP-RXSS 1840. A second phase 1800-2 is the same as the second phase operation 1000-2 of the first scheme. Compared with the first scheme, the second scheme does not have to execute the AP-TXSS redundantly and can reduce an execution time up to the second phase operation.

One beacon interval 1800 includes a BTI period 1801, an A-BFT period 1802, an AT period 1803 for providing an access opportunity, and a DTT period 1804 for data transmission/reception. The DTT period 1804 includes CBAPs and non-contention based scheduled SPs.

An operation 1800-1 of the first phase for the MIMO beam selection is conducted in the BTI period 1801 and the A-BFT period 1802, where a plurality of narrow beam candidates is selected. An operation 1800-2 of the second phase for the MIMO beam selection is conducted in the DTT period 1804, where the optimal TX/RX beam is selected. The operation of the first phase shall be described by referring to FIG. 18, and the operation of the second phase is executed in the same manner as explained in FIG. 17.

The first phase 1800-1 is conducted in order of AP-TXSS 1810, AP-TXSS feedback/STA-TXSS 1820, STA-TXSS feedback/STA-RXSS 1830, and AP-RXSS 1840. The AP-TXSS 1810 can be performed in the BTI period 1801. In a slot (e.g., ScS slot #2) of the A-BFT period 1802, the AP-TXSS feedback/STA-TXSS 1820, the STA-TXSS feedback/STA-RXSS 1830, and the AP-RXSS 1840 can be conducted.

In the AP-TXSS process 1810, the AP 100 changes (sweeps) and transmits narrow TX beams. The STA 200 receives the beam from the AP 100 in the quasi-omni mode, and selects a plurality of narrow TX beam candidates of the AP 100. Herein, provided that the number of the TX beams of the AP 100 is NT, the STA 200 selects nt-ary beams from NT. In an embodiment, the STA 200 can select nt-ary beams from NT in order of the signal strength. A method for selecting the beam candidates can be realized variously, and such methods have been described earlier.

In an embodiment, a TX array antenna of the AP 100 can concurrently perform the TXSS per antenna. For the TX array antenna of the AP 100 to concurrently perform the TXSS, information (e.g., preamble) for identifying the TX antenna needs to be defined so that the STA 200 can identify the TX antenna. In another embodiment, the TX array antenna of the AP 100 can sequentially perform TXSS as many as the antennas in the form of the SIMO.

An example of information required for selecting the narrow TX beams of the AP 100 in the AP-TXSS process 1810 is shown in FIG. 11. Herein, while the two RF chains and the two array antennas are exemplified, the scope of the present invention is not limited to this. The AP-TXSS enables the TX diversity transmission.

In the STA-TXSS/AP-TXSS feedback process 1820, the STA 200 changes (sweeps) and transmits narrow TX beams. The AP 100 receives the beam from the STA 200 in the quasi-omni mode, and selects a plurality of narrow TX beam candidates of the STA 200. Also, in the STA-TXSS/AP-TXSS feedback process 1820, the STA 200 feeds back the narrow beam candidates estimated through the AP-TXSS 100. Herein, provided that the number of the TX beams of the STA 200 is MT, the AP 100 selects mt-ary beams from MT. In an embodiment, the AP 100 can select mt-ary beams from MT in order of the signal strength. A method for selecting the beam candidates can be realized variously, and such methods have been described earlier.

In an embodiment, a TX array antenna of the STA 200 can concurrently perform the TXSS per antenna. For the TX array antenna of the STA 200 to concurrently perform the TXSS, information (e.g., preamble) for identifying the TX antenna needs to be defined so that the AP 100 can identify the TX antenna. In another embodiment, the TX array antenna of the AP 100 can sequentially perform TXSS as many as the antennas in the form of the SIMO.

In the STA-TXSS/AP-TXSS feedback process 1820, as the STA 200 performs the TXSS, the examples of the necessary information and the feedback information for feeding back the beam candidates of the AP 100 are shown in FIG. 12 and FIG. 13 as stated above. Herein, while the two RF chains and the two array antennas are exemplified, the scope of the present invention is not limited to this. The STA-TXSS enables the TX diversity transmission.

The STA-TXSS feedback/STA-RXSS process 1830 joins the STA-TXSS feedback process and the STA-RXSS process of the first scheme. When conducting the STA-RXSS process, the STA 200 receives STA-TXSS feedback information.

In the STA-TXSS feedback process 1830, the AP 100 feeds back the estimated MT-ary narrow TX beam candidates of the STA 200. In so doing, the AP 100 can use any one TX beam of the nt-ary narrow TX beam candidates of the AP 100 received in the STA-TXSS/AP-TXSS feedback process 1020. For example, the AP 100 can use the beam index of the maximum signal strength among the narrow TX beam candidates. The STA 200 receives the narrow TX beam candidates of the STA 200 in the quasi-omni mode.

In the STA-RXSS process 1840, the AP 100 transmits a signal using the quasi-omni mode or the beamforming. The STA 200 selects a plurality of narrow RX beam candidates of the STA 200 by sweeping the beam. When the AP 100 sends the signal using the beamforming, the AP 100 can utilize the beam of the maximum signal strength. Provided that the number of the RX beams of the STA 200 is MR, the STA 200 selects mr-ary beams from MR. In an embodiment, the STA 200 can select the mr-ary beams from MR in order of the signal strength.

The signal received at the STA 200 includes the STA-TXSS feedback information. Necessary information for the STA-TXSS feedback/STA-RXSS process 1830 is shown in FIG. 19.

Referring to FIG. 19, information 1900 includes STA-RXSS information 1910 and STA-TXSS feedback information 1920.

The STA-RXSS information 1910 includes Direction and CDOWN. Direction is an indicator indicating a forward link or a reverse link. CDOWN indicates the number of remaining beams (or sectors) which are not beam-swept. For example, Direction can include 1 bit and CDOWN can include 9 bits.

The STA-TXSS feedback information 1920 includes Antenna select, Sector select, and SNR report per RF chain. Antenna select indicates an ID of the selected antenna. A plurality of Sector selects indicates information about candidates beams for the antenna of the STA 200. Sector select_1 indicates first candidate beam information for the antenna of the STA 200, and Sector select_mt indicates mt-th candidate beam information for the antenna of the STA 200. A plurality of SNR reports indicates an SNR value of each Sector select. SNR report_1 indicates the SNR value of Sector select_1, and SNR report_mt indicates the SNR value of Sector select_mt. For example, Antenna select can include 2 bits, each Sector select can include 6 bits, and each SNR report can include 8 bits.

In the AP-RXSS process 1840, the STA 200 transmits a signal using the quasi-omni mode or the beamforming. The AP 100 selects narrow RX beam candidates of the AP 100 while sweeping the beam. When the STA 200 sends the signal using the beamforming, the STA 200 can use the beam of the maximum signal strength. Provided that the number of the RX beams of the AP 100 is NR, the AP 100 selects nr-ary beams from NR. An example of the information for the AP-RXSS is shown in FIG. 16 as mentioned earlier.

The second phase 1800-2 is executed in the same manner as the second phase 1000-2 of the first scheme explained in FIG. 17.

FIG. 20 is a diagram showing a processing procedure of a MIMO beam selecting operation according to yet another embodiment of the present invention. Here, while the MIMO beam selecting operation is explained as an example in a beacon interval as a superframe according to the IEEE 802.11ad standard, the scope of the present invention is not limited to this.

Referring to FIG. 20, this embodiment is the third scheme of the MIMO beam selection, assuming beam reciprocity of DL/UL links. The third scheme can omit all of the RXSS related processes compared with the second scheme of FIG. 18, that is, can omit the STA-RXSS and the AP-RXSS of the second scheme. A first phase 2000-1 for selecting a plurality of narrow TX/RX beam candidates of the AP/STA for MIMO channel establishment is conducted in order of AP-TXSS 2010, AP-TXSS feedback/STA-TXSS 2020, and STA-TXSS feedback 2030. A second phase 1800-2 is the same as the second phase operation 1000-2 of the first scheme and the second scheme. Compared with the second scheme, the third scheme can omit the STA-RXSS and the AP-RXSS and thus reduce the execution time of the beam selecting operation.

One beacon interval 2000 includes a BTI period 2001, an A-BFT period 2002, an AT period 2003 for providing an access opportunity, and a DTT period 2004 for data transmission/reception. The DTT period 2004 includes CBAPs and non-contention based scheduled SPs.

An operation 2000-1 of the first phase for the MIMO beam selection is conducted in the BTI period 2001 and the A-BFT period 2002, where a plurality of narrow beam candidates is selected. An operation 2000-2 of the second phase for the MIMO beam selection is conducted in the DTT period 2004, where an optimal TX/RX beam is selected. The operation of the first phase shall be described by referring to FIG. 20, and the operation of the second phase is executed in the same manner as explained in FIG. 17.

The first phase 2000-1 includes a process for selecting a plurality of narrow TX beam candidates of the AP and the STA through AP-TXSS 2010, AP-TXSS feedback and STA-TXSS 2020, and STA-TXSS feedback 2030. Also, the first phase 1000-1 includes the process for selecting the narrow TX beam candidates without a separate RXSS related process. The AP-TXSS 1020 not only estimates AP TX beam candidates but also considers the AP TX beam candidates as AP RX beam candidates based on reciprocity of the TX beam and the RX beam. The STA-TXSS 2020 not only estimates STA TX beam candidates but also considers the STA TX beam candidates as STA RX beam candidates based on the reciprocity of the TX beam and the RX beam. The AP-TXSS 2010 can be performed in the BTI period 2001. In a slot (e.g., ScS slot #2) of the A-BFT period 2002, the AP-TXSS feedback and the STA-TXSS 2020, and the STA-RXSS 2030 can be conducted. Compared with the second scheme, the STA-RXSS and the AP-RXSS are omitted in a slot (e.g., ScS slot #2) of the A-BFT period 1802 of FIG. 18.

In the AP-TXSS process 2010, the AP 100 changes (sweeps) and transmits narrow TX beams. The STA 200 receives the beam from the AP 100 in the quasi-omni mode, and selects a plurality of narrow TX beam candidates of the AP 100. Herein, provided that the number of the TX beams of the AP 100 is NT, the STA 200 selects nt-ary beams from NT. In an embodiment, the STA 200 can select nt-ary beams from NT in order of the signal strength. The method for selecting the beam candidates can be realized variously, and such methods have been described earlier.

In an embodiment, a TX array antenna of the AP 100 can concurrently perform the TXSS per antenna. For the TX array antenna of the AP 100 to concurrently perform the TXSS, information (e.g., preamble) for identifying the TX antenna needs to be defined so that the STA 200 can identify the TX antenna. In another embodiment, the TX array antenna of the AP 100 can sequentially perform TXSS as many as the antennas in the form of the SIMO.

An example of information required for selecting the narrow TX beams of the AP 100 in the AP-TXSS process 2010 is shown in FIG. 11 as mentioned above. Herein, while the two RF chains and the two array antennas are exemplified, the scope of the present invention is not limited to this. The AP-TXSS enables the TX diversity transmission.

The AP TX beam candidates estimated in the AP-TXSS process 2010 are considered as the AP RX beam candidates (NT=NR, nt=nr).

In the STA-TXSS/AP-TXSS feedback process 2020, the STA 200 changes (sweeps) and transmits narrow TX beams. The AP 100 receives the beam from the STA 200 in the quasi-omni mode, and selects a plurality of narrow TX beam candidates of the STA 200. Also, in the STA-TXSS/AP-TXSS feedback process 2020, the STA 200 feeds back the narrow beam candidates estimated through the AP-TXSS 100. Herein, provided that the number of the TX beams of the STA 200 is MT, the AP 100 selects mt-ary beams from NT. In an embodiment, the AP 100 can select nt-ary beams from NT in order of the signal strength. The method for selecting the beam candidates can be realized variously, and such methods have been described earlier.

In an embodiment, a TX array antenna of the STA 200 can concurrently perform the TXSS per antenna. For the TX array antenna of the STA 200 to concurrently perform the TXSS, information (e.g., preamble) for identifying the TX antenna needs to be defined so that the AP 100 can identify the TX antenna. In another embodiment, the TX array antenna of the AP 100 can sequentially perform as many as the antennas in the form of the SIMO.

In the STA-TXSS/AP-TXSS feedback process 2020, as the STA 200 performs the TXSS, the examples of the necessary information and the feedback information for feeding back the beam candidates of the AP 100 are shown in FIG. 12 and FIG. 13 as stated above. Herein, while the two RF chains and the two array antennas are exemplified, the scope of the present invention is not limited to this. The STA-TXSS enables the TX diversity transmission.

The STA TX beam candidates estimated in the STA-TXSS/AP-TXSS process 2020 are considered as the STA RX beam candidates (MT=MR, mt=mr).

In the STA-TXSS feedback process 2030, the AP 100 feeds back the estimated MT-ary narrow TX beam candidates of the STA 200. In so doing, the AP 100 can use any one TX beam of the mt-ary narrow TX beam candidates of the AP 100 received in the STA-TXSS/AP-TXSS feedback process 2020. For example, the AP 100 can use the beam index of the maximum signal strength among the narrow TX beam candidates. The STA 200 receives the narrow TX beam candidates of the STA 200 in the quasi-omni mode.

The second phase 1800-2 is executed in the same manner as the second phase 1000-2 of the first scheme as mentioned in FIG. 17.

So far, the first scheme through the third scheme of the MIMO beam selecting procedure according to embodiments of the present invention have been described. The second scheme and the third scheme relate to the method for reducing the whole processing time according to the execution of the first scheme. Hereafter, the fourth scheme and the fifth scheme relate to a method for reducing information transmission during the procedure execution. When the information transmission is reduced, a packet length is shortened and thus the time for executing the whole procedure can be reduced.

The fourth scheme relates to the method for reducing necessary information in the feedback related operation of the whole procedure of the MIMO beam selection. The feedback process in the first scheme through the third scheme feeds back the information including the selected beam and its SNR value. When the selected beam index is arranged and fed back based on the signal strength, instead of including the SNR value per beam in the feedback information, the feedback information can include only the information for the beam selection.

FIG. 21 is a diagram showing AP-TXSS feedback information according to another embodiment of the present invention, where feedback information is minimized in the AP-TXSS feedback/STA-TXSS process of the whole procedure of the MIMO beam selection.

Referring to FIG. 21, AP-TXSS feedback information 2100 includes Antenna select and Sector select per RF chain. Antenna select indicates an ID of the selected antenna. A plurality of Sector selects indicates information about candidates beams for the antenna of the AP 100. Sector select_1 indicates first candidate beam information for the antenna of the AP 100, and Sector select_nt indicates nt-th candidate beam information for the antenna of the AP 100. For example, Antenna select can include 2 bits, and each Sector select can include 6 bits.

As such, the AP-TXSS feedback information does not include SNR values of the beam candidates. Instead, information about the beam candidates (sector select fields) in the feedback information is arranged in an ascending order of the SNR. Such feedback information does not include the SNR report field as shown in FIG. 13, and accordingly the feedback information can achieve reduction effect of (8×2× nt bits).

FIG. 22 is a diagram showing STA-TXSS feedback information according to yet another embodiment of the present invention, where feedback information is minimized in the STA-TXSS feedback process of the whole procedure of the MIMO beam selection.

Referring to FIG. 22, STA-TXSS feedback information 2200 includes Antenna select and Sector select per RF chain. Antenna select indicates an ID of the selected antenna. A plurality of Sector selects indicates information about candidates beams for the antenna of the STA 200. Sector select_1 indicates first candidate beam information for the antenna of the STA 200, and Sector select_nt indicates nt-th candidate beam information for the antenna of the STA 200. For example, Antenna select can include 2 bits, and each Sector select can include 6 bits.

As such, the STA-TXSS feedback information does not include SNR values of the beam candidates. Instead, information about the beam candidates (sector select fields) in the feedback information is arranged in an ascending order of the SNR. Such feedback information does not include the SNR report field as shown in FIG. 14, and accordingly the feedback information can achieve reduction effect of (8×2× nt bits).

The embodiments of the first scheme through the fourth scheme are the structures where the antenna array transmits the same information so as to operate the transmit diversity in order to increase coverage. When the coverage increase is not necessary, a spatial multiplexing transmission scheme where each antenna transmits different information can be used. The fifth scheme can reduce more information bits transmitted in each scheme by transmitting information using the spatial multiplexing transmission scheme.

FIG. 23 is a diagram showing AP-TXSS information according to another embodiment of the present invention. This information indicates an example of the AP-TXSS information transmitted by each antenna array when the spatial multiplexing scheme is applied. The information according to this example is contrasted with the information of FIG. 11.

Referring to FIG. 23, AP-TXSS information 2300 includes Direction, Sector ID, Antenna ID, and CDOWN. Direction is an indicator indicating a forward link or a reverse link. Sector ID indicates a beam (or sector) index currently transmitting. Antenna ID indicates an antenna index currently transmitting. CDOWN indicates the number of remaining beams (or sectors) which are not beam-swept. For example, Direction can include 1 bit, Sector ID can include 6 bits, Antenna ID can include 2 bits, and CDOWN can include 9 bits FIG. 24 is a diagram showing STA-TXSS/AP-TXSS feedback information according to yet another embodiment of the present invention. This information indicates an example of the STA-TXSS/AP-TXSS feedback information transmitted by each antenna array when the spatial multiplexing scheme is applied. The information according to this example is contrasted with the information of FIG. 12 and FIG. 21.

Referring to FIG. 24, STA-TXSS/AP-TXSS feedback information 2400 includes STA-TXSS information 2410 and AP-TXSS feedback information 2420.

The STA-TXSS information 2410 includes Direction, Sector ID, Antenna ID, and CDOWN. Direction is an indicator indicating a forward link or a reverse link. Sector ID indicates a beam (or sector) index currently transmitting. Antenna ID indicates an antenna index currently transmitting. CDOWN indicates the number of remaining beams (or sectors) which are not beam-swept. For example, Direction can include 1 bit, Sector ID can include 6 bits, Antenna ID can include 2 bits, and CDOWN can include 9 bits The AP-TXSS feedback information 2420 includes Antenna select and Sector select. Antenna select indicates an ID of the selected antenna. A plurality of Sector selects indicates information about candidate beams for the antenna of the AP 100. Sector select_1 indicates first candidate beam information for the antenna of the AP 100, and Sector select_n indicates candidate beam information of an (nt/n)-th signal strength for the antenna of the AP 100. For example, Antenna select can include 2 bits, and each Sector select can include 6 bits.

FIG. 25 is a diagram showing STA-TXSS feedback information according to yet another embodiment of the present invention. This information indicates an example of the STA-TXSS feedback information transmitted by each antenna array when the spatial multiplexing scheme is applied. The information according to this example is contrasted with the information of FIG. 22.

Referring to FIG. 25, STA-TXSS information 2500 includes Direction, Sector ID, Antenna ID, CDOWN, Antenna select, and a plurality of Sector selects. Direction is an indicator indicating a forward link or a reverse link. Sector ID indicates a beam (or sector) index currently transmitting. Antenna ID indicates an antenna index currently transmitting. CDOWN indicates the number of remaining beams (or sectors) which are not beam-swept. STA-TXSS feedback information 2200 includes Antenna select and Sector select per RF chain. Antenna select indicates an ID of the selected antenna. A plurality of Sector selects indicates information about candidates beams for the antenna of the STA 200. Sector select_1 indicates candidate beam information of the first signal strength for the antenna of the STA 200, and Sector select_m indicates candidate beam information of an m-th signal strength for the antenna of the STA 200. For example, Direction can include 1 bit, Sector ID can include 6 bits, Antenna ID can include 2 bits, CDOWN can include 9 bits, Antenna select can include 2 bits, and each Sector select can include 6 bits.

Figure 26:
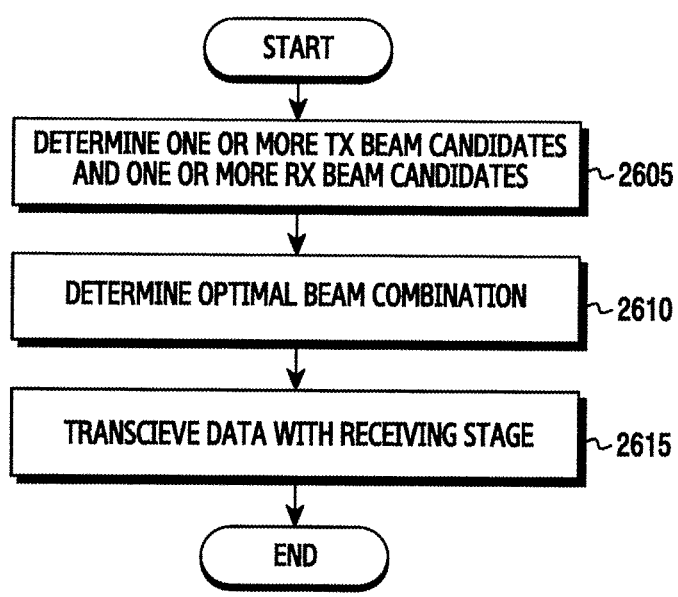
FIG. 26 is a diagram illustrating a method for operating a transmitting node according to yet another embodiment of the present invention.

FIG. 26 is a diagram illustrating a method for operating a transmitting node according to yet another embodiment of the present invention.

Referring to FIG. 26, in step 2605, the transmitting node determines at least one TX beam candidate from the TX beams and at least one RX beam candidate from the RX beams. In an embodiment, the beam candidates includes a predefined number of beam candidates determined based on the signal strength among the beams. In another embodiment, the beam candidates include beam candidates of the signal strength exceeding a particular threshold among the beams. In yet another embodiment, the beam candidates include a predefined number of beam candidates among beams of the signal strength exceeding a particular threshold among the beams. In still another embodiment, the beam candidates include beam candidates of a predefined range based on the beam of the maximum signal strength among the beams. In a further another embodiment, the beam candidates include a predefined number of beam candidates among beams of a predefined range based on the beam of the maximum signal strength among the beams. In a further another embodiment, the beam candidates include beam candidates exceeding a second threshold among beams of the signal strength exceeding a first threshold among the beams. In an embodiment, determining the beam candidates includes sweeping transmit beams having a narrow beam pattern of the transmitting node, and receiving feedback information about the transmit beam candidates of the transmitting node from the receiving node. In another embodiment, determining the beam candidates includes determining receive beam candidates of the transmitting node from a plurality of receive beams of the transmitting node by sweeping receive beams having a narrow beam pattern of the transmitting node. In yet another embodiment, determining the beam candidates includes determining the receive beam candidates of the transmitting node, having reciprocity with the transmit beam candidates among a plurality of receive beams of the transmitting node. The transmitting node determines at least one transmit beam candidate from a plurality of transmit beams of the receiving node in response to the transmit beams having the narrow beam pattern swept by the receiving node, and transmits feedback information comprising the transmit beam candidates of the receiving node, to the receiving node. In an embodiment, receiving the feedback information about the transmit beam candidates of the transmitting node, and determining the at least one transmit beam candidate from the transmit beams are jointly performed.

In step 2610, the transmitting node determines an optimal beam pair from pairs of the TX beam candidates and the RX beam candidates. In an embodiment, the transmitting node determines an optimal uplink beam pair to be used to receive data transmitted from the receiving node to the transmitting node among beam pairs of the TX beam candidates of the receiving node and the RX beam candidates of the transmitting node.

In step 2615, the transmitting node transmits/receives data to/from the receiving node based on the optimal beam pair. When blocking occurs in the process of the data transmission/reception with the receiving node, the transmitting node re-performs the process for determining the optimal beam pair.

As stated above, the embodiments of the present invention provide a more adequate beam selecting procedure for the MIMO communication and also the examples of the information required in each process. Features of such embodiments of the present invention can be summarized as below.

First, the MIMO beam selecting procedure is divided largely into the first phase which selects the narrow beam candidates, and the second phase which determines the optimal TX/RX beam pair. Herein, the first phase is conducted by combining the TXSS and the RXSS.

Second, the SLS and the BRP are performed in sequence in IEEE 802.11ad, whereas the first phase of the present invention is operated at long term intervals and the second phase is operated at short term intervals.

Third, the first phase of the present invention uses the narrow beam, unlike the wide beam in the SLS of IEEE 802.11ad.

Fourth, the first phase of the present invention selects the multiple narrow beam candidates, unlike the optimal sector beam selected in the SLS of IEEE 802.11ad.

Fifth, the first phase of the present invention feeds back the information of the multiple narrow beam candidates, unlike the information of the optimal sector beam fed back in the SLS of IEEE 802.11ad.

Sixth, schemes for selecting the narrow beam candidates include a scheme for selecting a predefined number of (e.g., n-ary) beams, a scheme for selecting beams of the signal strength over a particular threshold, a scheme for selecting up to p-ary beams of the signal strength over a particular threshold, a scheme for selecting beams of a certain range based on the beam of the maximum signal strength, a scheme for selecting up to p-ary beams of a certain range based on the beam of the maximum signal strength, a scheme for selecting an optimal beam based on a plurality of thresholds (e.g., a first threshold, a second threshold), and the like.

Seventh, the TRN length in the second phase of the present invention can be flexible according to the scheme for selecting the narrow beam candidates.

Eighth, the second phase of the present invention selects the MIMO beam through the one-shot training, unlike the BRP of IEEE 802.11ad.

Such embodiments of the present invention can minimize overhead of the beam TRN period for the beam selection, is robust to the blocking of the selected beam, and reduce the reception complexity.

As above, the present invention has been described with the limited embodiments and drawings, but the present invention is not limited to the above embodiments and those skilled in the art of the present invention can make various modifications and changes from the disclosure.

Certain aspects of the present invention can also be embodied as computer readable code on a computer readable recording medium. The computer readable recording medium is any data storage device which can store data readable by a computer system. Examples of the computer readable recording medium include a Read Only Memory (ROM), a Random Access Memory (RAM), Compact Disc-ROMs (CD-ROMs), magnetic tapes, floppy disks, optical data storage devices, and carrier waves (like data transmission via Internet). The computer readable recording medium can also be distributed over network-coupled computer systems, and accordingly the computer readable code is stored and executed in a distributed fashion. In addition, functional programs, code, and code segments for accomplishing the present invention can be easily construed by programmers skilled in the art to which the present invention pertains.

Also, it should be understood that the apparatus and the method according to an embodiment of the present invention can be implemented in hardware, software, or a pair of hardware and software. Such software can be stored in, for example, regardless of it is erasable or re-writable, a volatile or non-volatile storage device such as a storage device such as ROM, or, for example, a memory such as a RAM, a memory chip, a device, or an integrated circuit, or, for example, a storage medium which is optically or magnetically recordable and machine-readable (e.g., computer-readable) such as a CD, a DVD, a magnetic disk, or a magnetic tape. The method according to an embodiment of the present invention can be implemented by a computer or a portable terminal including a controller and a memory, and the memory is an example of a machine-readable storage medium suitable to store a program or programs including instructions for implementing embodiments of the present invention.

Hence, the present invention includes a program including code for implementing the apparatus or the method defined in claims of the present specification and a machine-readable (computer-readable) storage medium storing such a program. Also, such a program can be electronically transferred through a medium such as communication signal carried through a wired or wireless connection, and the present invention appropriately includes equivalents thereof.

Also, the apparatus according to an embodiment of the present invention can receive and store the program from a program providing device wiredly or wirelessly connected. The program providing device can include a program including instructions for making the program providing device fulfill a predefined content protecting method, a memory for storing necessary information for the content protecting method, a communication unit for performing wired or wireless communication with the graphic processing device, and a control unit for sending a corresponding program to the transceiving device as requested by the graphic processing device or automatically.

While the specification of the present invention has described certain embodiments thereof, it will be understood that various changes can be made therein without departing from the spirit and scope of the invention. Hence, the scope of the present invention is not limited to the mentioned embodiment and should be defined by the appended claims and their equivalents.

The invention claimed is:

1. A method for operating a first device in a wireless communication system, the method comprising:
   receiving a first set of signals that is transmitted using transmit beams of a second device, through a quasi-omni receive beam of the first device to determine transmit beam candidates for the second device;
   receiving a second set of signals that is transmitted using one of the transmit beams or a quasi-omni transmit beam of the second device, through receive beams of the first device to determine receive beam candidates for the first device;
   transmitting information indicating at least one of a transmit beam and a receive beam in a beam pair selected among beam pairs of the transmit beam candidates and the receive beam candidates; and
   receiving data signals through the beam pair.

2. The method of claim 1, wherein the transmit beam candidates comprise one of:
   a predefined number of beams that is determined based on signal strength among the transmit beams of the second device;
   a predefined number of beams including a signal strength exceeding a threshold among the transmit beams of the second device;
   beams including a signal strength in a predefined range from a beam including a maximum signal strength among the transmit beams of the second device; or
   beams including a signal strength over a second threshold in beams including the signal strength over a first threshold among the transmit beams of the second device.

3. The method of claim 1, further comprising
   determining transmit beam candidates for the first device using the receive beam candidates for the first device based on a channel reciprocity.

4. The method of claim 3, further comprising determining an optimal uplink beam pair to be used to receive data transmitted from the second device to the first device among beam pairs of the transmit beam candidates of the second device and the receive beam candidates of the first device.

5. A first device in a wireless communication system, the first device comprising:
a transceiver; and
at least one processor coupled to the transceiver and configured to:
receive a first set of signals that is transmitted using transmit beams of a second device, through a quasi-omni receive beam of the first device to determine transmit beam candidates for the second device;
receive a second set of signals that is transmitted using one of the transmit beams or a quasi-omni transmit beam of the second device, through receive beams of the first device to determine receive beam candidates for the first device;
transmit information indicating at least one of a transmit beam and a receive beam in a beam pair selected among beam pairs of the transmit beam candidates and the receive beam candidates; and
receive data signals through the beam pair.

6. The first device of claim 5, wherein the beam candidates comprise a predefined number of beam candidates that are determined based on signal strength among a plurality of beams, a predefined number of beams among beams having a signal strength exceeding a threshold, beams in a predefined range from a beam having a maximum signal strength, or beams having a signal strength over a second threshold in beams having the signal strength over a first threshold among a plurality of beams.

7. The first device of claim 5, wherein the at least one processor is further configured to determine transmit beam candidates of first device using the receive beam candidates for the first device based on a channel.

8. The method of claim 1, further comprising transmitting a feedback signal for indicating the transmit beam candidates for the second device.

9. The method of claim 1, further comprising transmitting a third set of signals through transmit beams of the first device to determine transmit beam candidates for the first device.

10. The method of claim 9, further comprising receiving a feedback signal for indicating the transmit beam candidates.

11. The method of claim 9, wherein at least one of the second set of signals comprises information indicating the transmit beam candidates.

12. The method of claim 1, further comprising transmitting a fourth set of signals through one of transmit beams of the first device or a quasi-omni transmit beam of the first device to determine receive beam candidates for the second device.

13. The method of claim 1, further comprising determining the beam pair based on channel capacity that is determined by using each of the beam pairs.

14. The method of claim 1, further comprising:
receiving information indicating at least one of a transmit beam and a receive beam in another beam pair for transmitting signals from the first device to the second device; and
transmitting data signals through the other beam pair.

15. The first device of claim 5, wherein the at least one processor is further configured to transmit a feedback signal for indicating the transmit beam candidates for the second device.

16. The first device of claim 5, wherein the at least one processor is further configured to transmit a third set of signals through transmit beams of the first device to determine transmit beam candidates for the first device.

17. The first device of claim 16, wherein the at least one processor is further configured to receive a feedback signal for indicating the transmit beam candidates.

18. The first device of claim 17, wherein at least one of the second set of signals comprises information indicating the transmit beam candidates.

19. The first device of claim 5, wherein the at least one processor is further configured to transmit a fourth set of signals through one of transmit beams of the first device or a quasi-omni transmit beam of the first device to determine receive beam candidates for the second device.

20. The first device of claim 5, wherein the at least one processor is further configured to determine the beam pair based on channel capacity that is determined by using each of the beam pairs.

21. The first device of claim 5, wherein the at least one processor is further configured to:
receive information indicating at least one of a transmit beam and a receive beam in another beam pair for transmit signals from the first device to the second device; and
transmit data signals through the other beam pair.

* * * * *